US012121914B2

(12) United States Patent
Sato et al.

(10) Patent No.: US 12,121,914 B2
(45) Date of Patent: Oct. 22, 2024

(54) CENTRIFUGE SAMPLE CONTAINER, CENTRIFUGE ROTOR USING THE SAME, AND CENTRIFUGE

(71) Applicant: Eppendorf Himac Technologies Co., Ltd., Ibaraki (JP)

(72) Inventors: Jun Sato, Ibaraki (JP); Kenichi Nemoto, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 0 days.

(21) Appl. No.: 18/448,960

(22) Filed: Aug. 13, 2023

(65) Prior Publication Data

US 2023/0381793 A1 Nov. 30, 2023

Related U.S. Application Data

(62) Division of application No. 16/767,112, filed as application No. PCT/JP2018/036309 on Sep. 28, 2018, now Pat. No. 11,759,794.

(30) Foreign Application Priority Data

Nov. 28, 2017 (JP) ................................ 2017-227780

(51) Int. Cl.
*B04B 5/04* (2006.01)
*B01L 3/00* (2006.01)
*B04B 5/02* (2006.01)

(52) U.S. Cl.
CPC .......... *B04B 5/0421* (2013.01); *B01L 3/5021* (2013.01); *B04B 5/02* (2013.01); *B04B 5/0414* (2013.01); *B01L 2300/0832* (2013.01)

(58) Field of Classification Search
CPC ....... B04B 5/0421; B04B 5/02; B04B 5/0414; B01L 3/5021; B01L 2300/0832
USPC ...................................................... 494/16, 20
See application file for complete search history.

(56) References Cited

U.S. PATENT DOCUMENTS 2,878,994 A * 3/1959 Anderson ............. B04B 5/0407 422/918
9,757,739 B2 * 9/2017 Sato ...................... B04B 5/0421
11,759,794 B2 * 9/2023 Sato ...................... B01L 3/5021 494/20
2011/0183829 A1 * 7/2011 Nemoto ................ B04B 5/0421 494/20

(Continued)

FOREIGN PATENT DOCUMENTS

WO WO-2019106933 A1 * 6/2019 ............ B01L 3/5021
WO WO-2020066165 A1 * 4/2020 ......... G01N 21/0332

*Primary Examiner* — Charles Cooley
(74) *Attorney, Agent, or Firm* — JCIPRNET

(57) ABSTRACT

A centrifuge includes a bucket and a swing rotor. The swing rotor includes a through hole penetrating from an upper to a lower side in an axial direction of the swing rotor and a notch formed in a direction perpendicular to a central axis of the through hole and formed on a radial outer side of the swing rotor. The bucket includes a container. A flange having a seating surface seated in the notch during swinging is formed near the opening of the container, chamfering is performed in parallel on opposing outer surfaces of the container on a bottom side of the container with respect to the seating surface, a cross-section shape of the holding hole inside the container is formed to be elliptical, and a short axis direction of the cross section is arranged parallel to a swing rotation axis direction.

6 Claims, 14 Drawing Sheets

(56) References Cited

U.S. PATENT DOCUMENTS

| | | | | |
|---|---|---|---|---|
| 2013/0134159 | A1* | 5/2013 | Chan | B01L 3/508<br>220/500 |
| 2016/0214118 | A1* | 7/2016 | Sato | B04B 5/0421 |
| 2020/0398286 | A1* | 12/2020 | Sato | B01L 3/5021 |
| 2023/0381793 | A1* | 11/2023 | Sato | B01L 3/5021 |

* cited by examiner (1)

(2)

(1)

(2)

(1)

(2)

(3)

CENTRIFUGE SAMPLE CONTAINER, CENTRIFUGE ROTOR USING THE SAME, AND CENTRIFUGE

CROSS-REFERENCE TO RELATED APPLICATION

This application is a divisional of U.S. application Ser. No. 16/767,112 filed on May 26, 2020, which is a 371 application of the international PCT application serial No. PCT/JP2018/036309, filed on Sep. 28, 2018, which claims the priority benefit of Japan application No. 2017-227780, filed on Nov. 28, 2017. The entirety of the above-mentioned patent application is hereby incorporated by reference herein and made a part of this specification.

BACKGROUND OF THE INVENTION

Technical Field

The present invention relates to a centrifuge (a centrifugal separator), and particularly relates to an improvement in a sample container attached to a rotor rotated at a high speed.

Related Art

The centrifuge separates or purifies a sample by inserting a sample to be separated (for example, a culture solution, blood, or the like) into a rotor via a tube or a bucket container and rotating the rotor at a high speed. The rotation speed of the rotor is set in a range from a low speed (about several thousand rotations) to a high speed (the maximum rotation speed is 150,000 rpm) depending on the application. There are various types of rotors that can be used, such as an angle rotor in which a fixed-angle tube hole can cope with a high rotation speed, a swing rotor in which a bucket loaded with a tube swings from a vertical state to a horizontal state as the rotor rotates, and the like. In addition, there is a rotor that rotates at an extremely high rotation speed and applies a high centrifugal acceleration to a small amount of sample, a rotor that has a low rotation speed but can handle a large amount of sample, and the like. Because these rotors are selected in accordance with the amount of the sample to be separated or the rotation speed, the rotor is configured to be detachably attached to a rotation axis of the drive means, and the rotor can be replaced. In recent years, measurement precision of a measuring instrument that measures a sample after centrifugation has been significantly improved, and even an extremely small amount of sample can be measured. With the improvement in the measurement precision, there is a demand for a centrifuge to efficiently perform centrifugal separation of a solution containing a very small amount of sample and to efficiently collect the separated sample.

When the rotor rotates at a high speed in the air, the temperature of the rotor rises due to frictional heat (windage loss) with the air. Because some samples to be separated are required to be kept at a low temperature, a centrifuge using a cooling device that cools the rotor during operation is widely used. In patent literature 1, a centrifuge with an angle rotor is disclosed, and a plurality of holding holes for sample containers to be inserted into is formed in a circumferential direction of the rotor. The sample container used here has a small capacity of about two milliliters and is frequently used for separating a very small amount of sample. In addition, the sample container is often used disposably.

LITERATURE OF RELATED ART

Patent Literature

Paten literature 1: Japanese Patent Laid-Open No. 2012-035261

SUMMARY

Problems to be Solved

In the centrifuge of paten literature 1, an opening of the sample container is round-shaped, the approximately upper half is cylindrical, the approximately lower half is conical, and a front-end bottom part is a small-diameter hemispherical aggregation part. When this structure is employed in a sample container having a small capacity of about 2 milliliters, the front-end part becomes considerably thin, and thus a recovery rate of the sample is improved. The total number of the sample containers that can be arranged side by side on a circumference of the rotor is determined by a diameter of the sample container. Because an upper limit of an outer diameter of the rotor is limited by a size of the rotor chamber of the centrifuge, if the diameter of the rotor is determined, the number of the sample containers that can be arranged is almost determined. Therefore, in the technique of paten literature 1, the sample containers are arranged at inner and outer peripheral sides to increase the number of sample containers that can be centrifuged simultaneously, but there is a disadvantage that centrifugal loads on the sample containers at the inner peripheral side and the sample containers at the outer peripheral side are different. In addition, when a lid part is arranged on a body part of the sample container via a hinge part, it is necessary to align the position of the hinge part to a specific position when the sample containers are arranged in the holding holes of the rotor, and the alignment work may also be troublesome.

The present invention is completed in view of the above background, and an object of the present invention is to provide a centrifuge sample container and a centrifuge using the same, which increase, as compared with before, the total number of sample containers attachable to a rotor by achieving a sample container in which the cross-section shape orthogonal to a central axis in a longitudinal axial direction is not perfectly circular but flat. Another object of the present invention is to provide a centrifuge sample container and a centrifuge using the same, which can improve a recovery rate of pellets (sediments) of a small amount of sample and improve the efficiency of collection work of the recovered pellet by devising the shape of a bottom part of a sample container. Still another object of the present invention is to provide a centrifuge sample container and a centrifuge using the same, in which attachment to a rotor is easy and detachment after centrifugal separation operation can also be simplified by devising the dimension of a sample container being flat or the shape of a lid part. Still another object of the present invention is to provide a swing type centrifuge in which a bucket is achieved in which the cross-section shape orthogonal to a central axis in a longitudinal axial direction is not perfectly circular but flat, and thereby the total number of buckets that can be attached is increased as compared with before.

Means to Solve Problems

Representative features of the invention disclosed in the application are described as follows. According to one feature of the present invention, provided is a centrifuge sample container including a tubular body part and a bottom part closing a lower end side of the body part. The body part is a tubular part having two parallel plane surfaces and has an opening which is elliptical when viewed from above, and the bottom part is formed by a semi-cylindrical part and quarter spherical parts connected to sides of the semi-cylindrical part. A height H of the body part of a sample container is greater than a length $L_2$ in a short axis direction of the opening, a curvature radius $R_1$ of an outer surface of an arc part of the elliptical shape, a curvature radius $R_2$ of an outer surface of the semi-cylindrical part of the bottom part, and a curvature radius $R_3$ of an outer surface of each of the quarter spherical parts of the bottom part are formed to be equal. In addition, a peripheral edge abutment part which is engaged with a holding hole of a rotor of the centrifuge by expanding radially outward in a flange shape is formed at an upper end side of the opening of the body part.

According to another feature of the present invention, in the centrifuge sample container, a hinge part is formed which is bendable and arranged in a manner of extending from a center of the curvature radius $R_1$ of the peripheral edge abutment part, and a lid part which seals the opening of the body part is fixed to a front-end of the hinge part. The body part, the bottom part, the hinge part, and the lid part of the centrifuge sample container are manufactured by integral formation of a synthetic resin. In addition, a rated capacity of the centrifuge sample container is less than 20 milliliters, and a length $L_1$ in a long axis direction of the opening exceeds the length $L_2$ in the short axis direction. Furthermore, thicknesses of walls of the body part and the bottom part are uniform. Of the two quarter spherical parts, the quarter spherical part positioned on one side of the bottom part is an aggregation part of a sample accommodated in the centrifuge sample container.

According to still another feature of the present invention, provided is a centrifuge rotor which is an angle type rotor and has a plurality of holding holes holding the above centrifuge sample container. Each of the holding holes has a shape similar to an outer surface shape of the sample container, a cross-section shape orthogonal to a central axis of the holding hole of the rotor is an ellipse shape having two parallel straight parts, a long axis direction is arranged to match a radial direction of the rotor and a short axis direction is arranged to be a circumferential direction of the rotor. The holding holes of the centrifuge rotor are arranged at equal intervals in the circumferential direction of the rotor, and a smallest distance d between two adjacent holding holes (a distance to a closest portion on the inner peripheral side) is smaller than the length $L_2$ in the short axis direction of the holding holes (≈ a length in the short axis direction of the sample container). In addition, an inclination angel of the angle type centrifuge rotor is 45 degrees, and a lowest end of a bottom surface of the sample container that is attached to the holding hole is held to intersect at 90 degrees with respect to the inclination angel. The centrifuge can be achieved which can simultaneously perform centrifugal separation on multiple sample containers by attaching this centrifuge rotor and using a drive part rotating the rotor and a rotor chamber accommodating the rotor.

According to still another feature of the present invention, a swing centrifuge includes: a bucket having a rotation axis for swinging and a swing rotor. The swing rotor includes a through hole penetrating from an upper side to a lower side in an axial direction of the swing rotor, a support part rotably holding the rotation axis, and a notch part formed in a direction perpendicular to a central axis of the through hole and formed on a radial outer side of the swing rotor. The swing centrifuge performs centrifugal separation operation in a state that the bucket is swung around the rotation axis by a rotation of the swing rotor and abuts against the notch part. The bucket includes a container part which accommodates a sample and has an opening in which screw means is formed, and a lid part which seals the container part by screwing and holds the rotation axis. A flange part having a seating surface seated in the notch part during swinging is formed near the opening of the container part, chamfering is performed in parallel on opposing outer surfaces of the container part having a cylindrical outer shape on a bottom side of the container part with respect to the seating surface, a cross-section shape of the holding hole inside the container part is formed to be elliptical, and a short axis direction of the cross-section shape of the holding hole is arranged parallel to a swing rotation axis direction.

According to still another feature of the present invention, the rotation axis which extends in a direction perpendicular to a center line in a longitudinal direction of the container part is arranged in the lid part of the bucket, and the lid part has a disk part which covers the opening of the container part and a rotation axis hold part which holds the rotation axis slidably in the axial direction above the disk part. The flange part of the container part is substantially rectangular when viewed from the longitudinal direction. Two short side parts whose widths are narrowed and two opposite long side parts whose widths are widened are formed, and the seating surface is formed in a manner of extending from the central axis to a side of the short side parts. The long side parts are arranged in a direction of an axis of the swing rotation axis from the central axis. At this time, the short side parts are arranged in a direction orthogonal to the axis of the swing rotation axis. In addition, with respect to the shape of the holding hole of the container part, the cross section orthogonal to the central axis in the longitudinal direction is elliptical, a bottom part of the container part which is a front-end is made into a narrowed shape, and the front-end that has being narrowed is configured to be hemispherical. With respect to an outer surface shape of the container part, there may be one or more pairs of two parallel plane surfaces in one direction or a direction orthogonal to the one direction. The two plane surfaces can be formed by chamfering and cutting a cylindrical outer peripheral surface. Furthermore, a tube integrally formed by a synthetic resin and having a substantially similar outer shape corresponding to the shape of the holding holes are insertable into the holding holes. The tube has an elliptical cross section orthogonal to the central axis direction and have two semi-circular portions and two parallel surfaces straightly connecting the two semi-circular portions.

Effect

According to the present invention, when the opening part of the sample container is viewed from the upper side in the central axis direction, the opening part is not round but elliptical, and has a flat tube shape in which an aspect ratio between the long axis direction and the short axis direction of the opening is changed Therefore, the width of the opening part in the circumferential direction can be reduced, and multiple sample containers can be arranged on the same circle of the rotor. In addition, because the opening part of the sample container is elliptical, and the long axis direction of the opening part is arranged to match the radial direction of the rotor, the same capacity as the conventional cylindrical sample container can be maintained. Furthermore, because the bottom surface shape of the flat sample container is devised, although the width of the opening part in the short axis direction is narrower than before, the pellets (the sediments) are easier to take out than before, and the recovery rate of the pellets can be improved.

DESCRIPTION OF THE EXAMPLES

Example 1

Embodiments of the present invention are specifically described below based on the drawings. Moreover, in the following diagrams, the same parts are denoted by the same reference signs, and a repeated description is omitted. In addition, in the specification, description will be made assuming that the front, rear, up, and down directions are directions shown in the diagrams.

Figure 1:
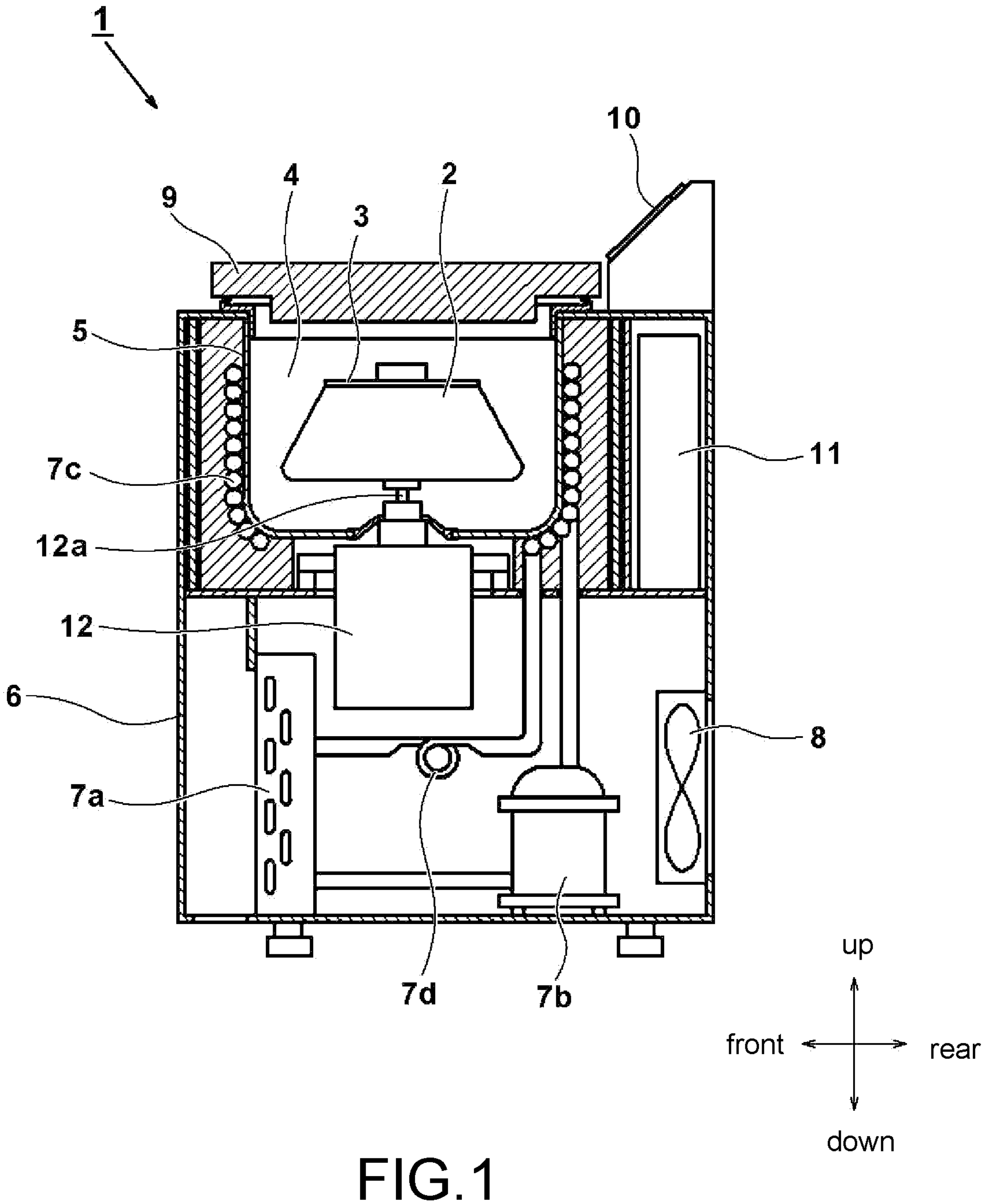
FIG. 1 is a longitudinal cross-section view showing an overall configuration of a centrifuge 1 according to an example of the present invention.

FIG. 1 is a cross-section view showing the configuration of a centrifuge (centrifugal separator) 1 according to an example of the present invention. At an upper part of a housing 6 of the centrifuge 1, an operation display part 10 is arranged which is configured for a user to operate to input information and display necessary information. Preferably, for example, a touch panel type liquid crystal display (LCD) device is used as the operation display part 10; however, any display device or input device may be used. Inside the housing 6, a rotor chamber 4 for accommodating a rotor 2 is arranged. The rotor chamber 4 is defined by a bowl 5 made of a rust-resistant material such as stainless steel or the like. In the example, a cooling device is arranged to prevent the temperature of the rotor chamber 4 from rising due to rotation of the rotor 2. The cooling device includes a condenser 7*a*, a compressor 7*b*, a refrigeration pipe 7*c* wound around the bowl and a capillary tube 7*d*, and a cooling fan 8 which gives cooling air to the condenser 7*a* is arranged in a part of the housing. Moreover, the type of the cooling device is not limited to the compressor type and a cooling device of other types such as a Peltier type may be used. In addition, when the cooling in the rotor chamber 4 is unnecessary, a centrifuge without a cooling device may be used.

The rotor chamber 4 is configured in a manner that an opening part in an upper surface of the rotor chamber 4 can be opened and closed by a door 9, and by opening the door 9, the rotor 2 for storing a sample to be centrifugally separated can be attached to or detached from the interior of the rotor chamber 4. A control part 11 controls a motor 12 that rotates the rotor 2 in accordance with a value set from the operation display part 10, and also controls a rotation speed of the compressor 7*b* and the rotation of the cooling fan 8 to perform appropriate cooling by passing refrigerant through the refrigeration pipe 7*c* wound around the bowl 5. The rotor 2 is configured to be detachable from a rotation axis 12*a* of the motor 12 serving as a drive part, and an upper opening portion of the rotor 2 is closed by a detachable rotor cover 3 for reducing windage loss caused by the rotation of the rotor 2. Moreover, in order to further reduce the windage loss, the centrifugal separation operation may be performed in a state that the pressure in the rotor chamber 4 is reduced using a vacuum pump device such as an oil rotary vacuum pump, an oil diffusion vacuum pump or the like.

The control part 11 includes a microcomputer which is not shown, and volatile and nonvolatile storage memories, and the control part 11 receives operation conditions (rotation speed, operation time, set temperature, operation rotor, and the like) set by a touch panel of the operation display part 10 and uses information such as operation conditions and information of the attached rotor stored in advance in a storage device in the control part 11 to perform rotation control of the motor 12, temperature control of the rotor chamber 4 performed by the compressor 7*b*, input of the information from the operation display part 10, and display of various information to the operation display part 10. These controls of the control part 11 can be controlled using software by the microcomputer executing programs stored in storage means.

Figure 2:
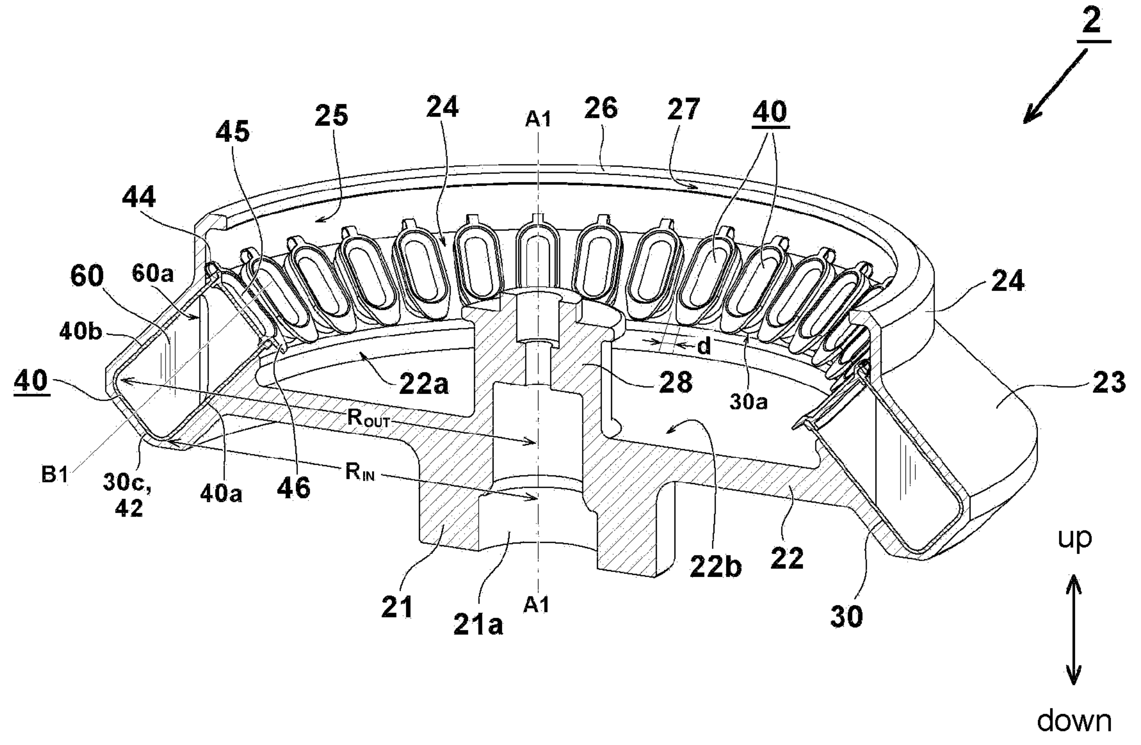
FIG. 2 is a cross-section perspective view showing a state in which a centrifugal load during centrifugal separation operation of a rotor 2 in FIG. 1 is applied (illustration of a rotor cover 3 is omitted).

FIG. 2 is a cross-section perspective view of the rotor 2 in FIG. 1 and shows a state that a plurality of sample containers 40 is attached. In the rotor 2, a cylindrical part 21 which has an attaching hole 21*a* for being fastened to the rotation axis 12*a* (see FIG. 1) of the motor 12 is formed at a center part. A disk part 22 expanding radially outward is formed on an upper side of the cylindrical part. An inner bottom surface of the rotor 2, which is an upper surface of the disk part 22, is formed into a planar shape. On an outer peripheral side of the disk part 22 is arranged a mortar-shaped inner peripheral surface, that is, a formation surface 24 of a holding hole 30 which is formed obliquely to approach a central axis as going downward from above. The formation surface 24 has a substantially mortar shape (an inverted cone shape) in a manner that a diameter of a lower portion is small and a diameter of an upper portion is large. A metal solid part for forming the holding hole 30 of the sample container 40, that is, a rotor body 23, is formed outside and diagonally below the formation surface 24, and multiple holding holes 30 having a predetermined inclination angle are formed to be arranged in the circumferential direction. Openings 30*a* of the holding holes 30 are arranged at equal intervals in the circumferential direction on the formation surface 24, and the interval between adjacent openings 30*a* at the closest positions on the inner peripheral side is d.

The holding hole 30 has an inner wall shape having an outer diameter substantially the same as the outer diameter of the sample container 40, and is formed with such a size that the holding hole 30 has a minimum interval enough for the sample container 40 to be easily inserted into or detached from the holding hole 30. A vertical arrangement of the holding hole 30 is formed in a manner that a rotation radius increases from an opening 30*a* in an upper part to a bottom part 30*c* of the holding hole, and a central axis B1 is formed to have a given angle with respect to a rotation axis (a central axis) A1 of the rotor 2. In the example, the holding hole 30 is arranged in a manner that the inclination angle is 45 degrees and a rotation trajectory of a vertex of a quarter spherical part outside the bottom part 30*c* is the farthest from the rotation axis A1 of the rotor 2. A distance ($R_{OUT}$) between a vertex of an outer corner of the bottom surface part of the attached sample container 40 (a quarter spherical part 42*b* described later in FIG. 3) and the rotation axis of the rotor is greater than a distance ($R_{IN}$) between a vertex of an inner corner of the bottom surface part and the rotation axis of the rotor. Therefore, when centrifugal separation is performed, pellets are deposited near the corners on the outer peripheral side. Moreover, the inclination angle is arbitrary, but in the case of the example, the angle formed by a bottom part 42 of the sample container 40 with the rotation axis A1 and the angle formed by an outer side 40*b* of the sample container 40 with the rotation axis A1 are both 45 degrees, and thus improvement in collection efficiency of the pellets during centrifugal separation can be expected.

A recess 22*a* which is formed into a concave shape and is continuous in the circumferential direction is formed in a connection portion between an outer edge of the disk part 22 and the inside of the formation surface 24. A portion recessed into a concave shape is also formed between the outside of the formation surface 24 and an inner wall of a cylindrical part 25. The inside and outside of the formation surface 24 are recessed in a swing angle direction from the formation surface 24 in this manner, and thereby an operator can easily hold the inside and outside of the sample container 40 with fingers. Hence, the sample container 40 can be easily attached to and detached from the rotor 2. The cylindrical part 25 is formed extending upward outside an outer peripheral edge of the formation surface 24, an upper end of the cylindrical part 25 is formed as a flange part 26 bent inward, and an inner edge of the flange part 26 serves as an opening 27 of the rotor 2. Here, because a lower portion from the opening 27 has a container shape that is sealed and closed, if the opening 27 is sealed by the rotor cover 3 (see FIG. 1), the sample container 40 can be isolated from rotation wind generated in the rotor chamber 4 during centrifugal separation operation. The rotor cover 3 is fixed by screwing to a screw boss part 28 projecting upward coaxially with the rotation axis A1, and a method for fixing the rotor cover 3 to the rotor 2 is optional as long as a known rotor cover 3 is used and fixed.

Figure 12:
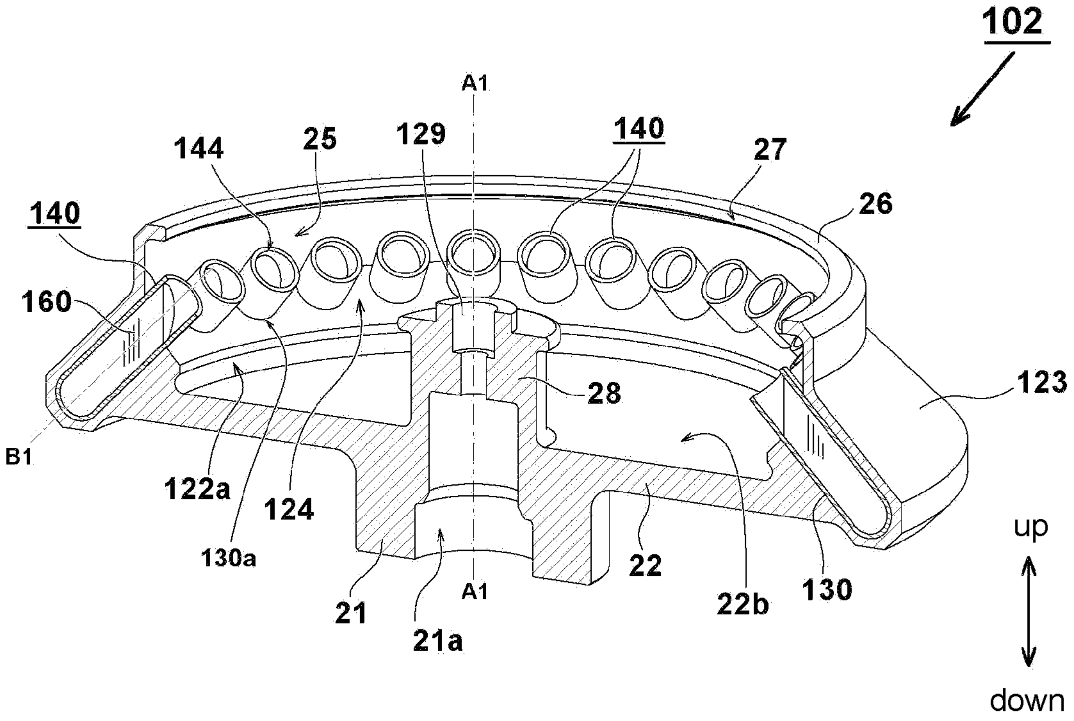
FIG.12 (RELATED ART)
FIG. 12 is a cross-section perspective view of a state of a conventional rotor 102 during centrifugal separation operation (a centrifugal load is applied) (illustration of a rotor cover is omitted).

Here, the shape of a conventional rotor 102 is described using FIG. 12 for comparison with the rotor 2 of the example. The basic shape of the rotor 2 of the example shown in FIG. 2 is equivalent to the basic shape of the conventional rotor 102, and the same parts are denoted by the same reference signs. On a mortar-shaped formation surface 124, a plurality of round-shaped openings 130*a* is arranged at predetermined intervals. A cylindrical sample container 140 is attached to each opening 130*a*. Here, the shape of the sample container 140 is described using FIG. 13. (1) of FIG. 13 is a top view of the conventional sample container 140, (2) of FIG. 13 is a side view (a partial cross-section view), and (3) of FIG. 13 is a cross-section perspective view showing a state that centrifugal separation operation is performed by a rotor 102 in FIG. 12 and a state that pellets (sediments) are being deposited just before the end.

Figure 13:
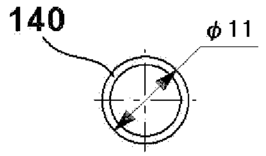
FIG.13 (RELATED ART)
FIG. 13 shows cross-section perspective views showing the shape of a conventional sample container 140, wherein (1) of FIG. 13 is a top view, (2) of FIG. 13 is a side view (a part of the cross-section view), and (3) of FIG. 13 a cross-section perspective view showing a state that the pellets (sediments) are being deposited just before the end of centrifugal separation.
Figure 13:
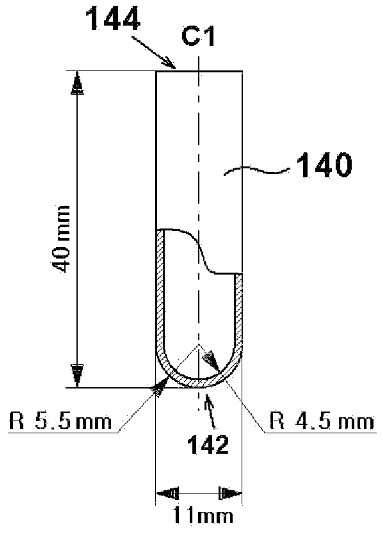
FIG.13 (RELATED ART)
Figure 13:
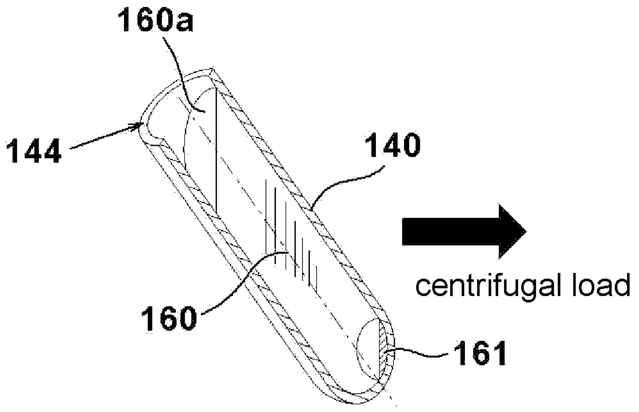
FIG.13 (RELATED ART)

Although no lid part is formed at an upper end opening of the sample container 140 in FIG. 13, a sample container having a lid part may be used. The opening of the sample container 140 has a round shape with an outer diameter of 11 mm as shown in (1) of FIG. 13. The sample container 140 is 40 mm in length in a longitudinal direction, and an outer surface of a bottom part 142 of the sample container 140 is formed into a hemispherical shape with a curvature radius of 5.5 mm. The sample container 140 is made of a transparent or translucent synthetic resin such as polypropylene and the like, and has a plate thickness of 0.7 to 1.2 mm. When the plate thickness is 1.0 mm, a curvature radius of an inner surface portion of the bottom part 142 is 4.5 mm. An inclination angle of the rotor 102 is approximately 25° to 45°, and because the inclination angle of the rotor 102 shown in FIG. 12 is 45°, if a centrifugal load direction is the direction shown by a black arrow, a liquid level 160*a* of a sample 160 during centrifugal separation operation is as shown in (3) of FIG. 13. In addition, pellets 161 after the centrifugal separation operation are deposited to be unevenly located on one side (a half surface side) of the bottom part 142. At this time, the relationship between a deposition position of the pellet 161*s* and an opening position of the sample container 140 has no reference part. Therefore, during the work after the sample container 140 is taken out, the operator needs to visually confirm the position of the pellets 161 from outside of the transparent sample container 140.

With reference to FIG. 12 again, holding holes 130 are formed radially obliquely outward of the openings 130*a*, and sample containers 140 are respectively mounted in the holding holes 130. In the case of a conventional rotor structure, because a cross-section shape orthogonal to the longitudinal central axis B1 of the holding holes 130 is round-shaped, if the holding holes are arranged uniformly in a circumferential direction, only a total of 28 holding holes 130 can be arranged in the circumferential direction. The reason is that an opening 144 of the sample container 140 projects above the opening 130*a* of the holding hole 130 and toward the inner peripheral side, and thus if the interval is too small, the openings 144 interfere with each other. In addition, in the conventional rotor 102 or the sample container 140, because there is no means for preventing auto-rotation of the sample container 140, there is a problem that the sample container 140 rotates by itself (auto-rotates) in the holding hole 130. However, according to the rotor 2 of the example as shown in FIG. 2, an outer shape of the sample container 40 is a non-circular cross-section shape, that is, a flat shape, and the height of the sample container 40 (the length in a direction of the central axis B1) is slightly lower, and thus the interval between adjacent holding holes 30 can be narrower than before. Furthermore, because the width of the sample container 40 in the circumferential direction is smaller than that of the conventional sample container 140 (details will be described later using FIG. 4), 32 holding holes 30 can be arranged in the circumferential direction.

In the example, because the sample container 40 is flat, the cross section of the holding hole 30 orthogonal to the central axis B1 is non-circular, and there is no possibility that the sample container 40 will auto-rotate inside the holding hole 30. As a result, pellets can always be deposited on outer corners of the sample container 40. Furthermore, as shown in FIG. 2, if a hinge part 46 for connecting a lid part 45 is mounted on the outer peripheral side when the sample container 40 is mounted, and collar parts 47 serving as handles when the lid part 45 is removed are arranged neatly side by side on the inner peripheral side, the corner where the sediments are deposited is always the bottom corner on a side where the hinge 46 is positioned, and thus when the operator recovers the sediments, the sedimentation position of the sediments will not be mistaken, and work efficiency is improved. Moreover, the sample container 40 may be mounted in a manner that the collar part 47 is arranged on the outer peripheral surface and the hinge part 46 is arranged inside. Even in this mounting direction, the operator can easily grasp which side of the bottom corner has pellets deposited thereon.

Figure 3:
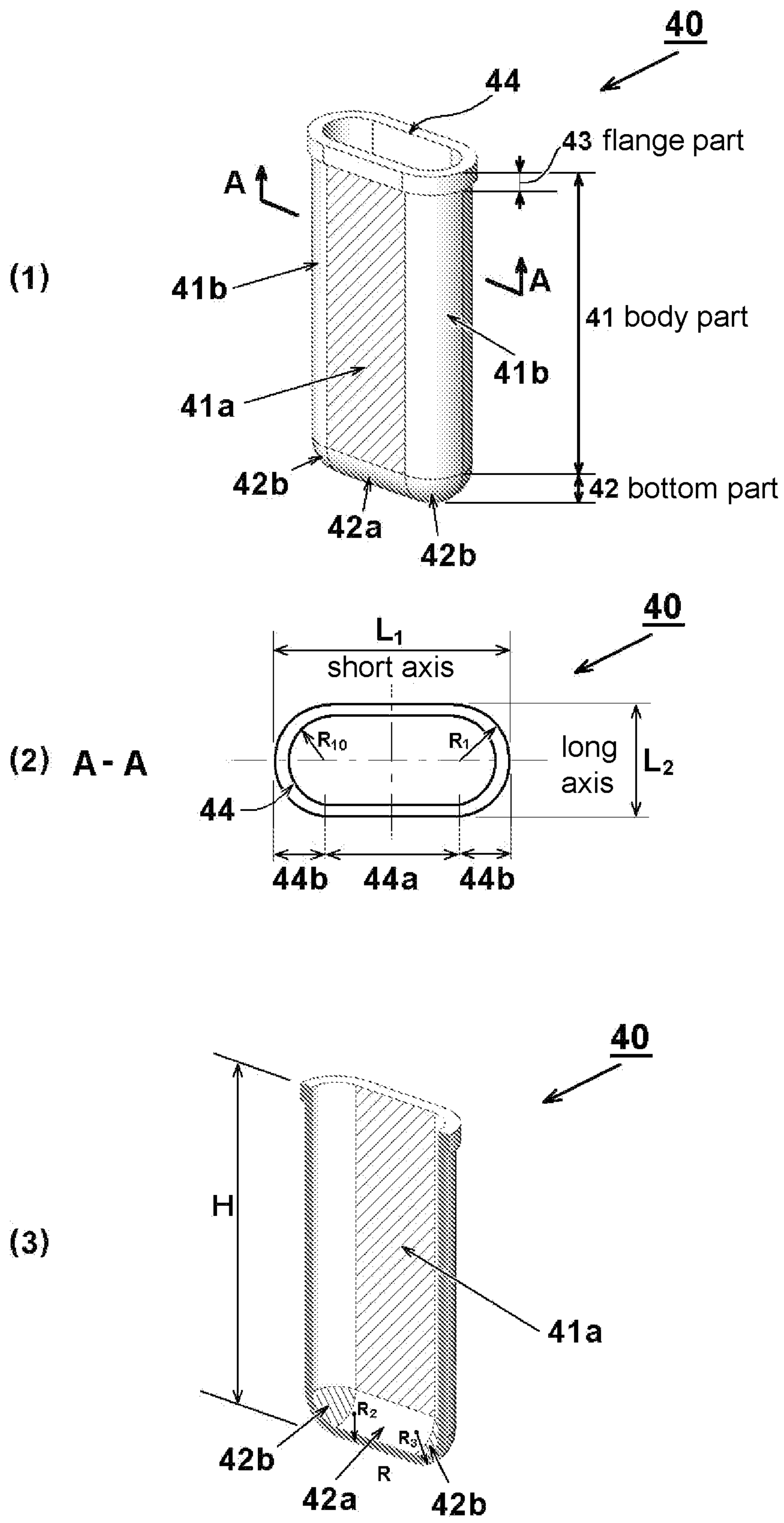
FIG. 3 shows diagrams showing the shape of a sample container 40 in FIG. 2, wherein (1) of FIG. 3 is a perspective view of a main body portion, (2) of FIG. 3 is a top view of the main body portion (a diagram showing the shape of an opening), (3) of FIG. 3 is a cross-section perspective view of a plane wall part of the main body portion.

Next, the shape of the sample container 40 mounted in the holding hole 30 of the rotor 2 is described using FIG. 3. Here, for ease of description, the description of the lid part 45, the hinge part 46, and the collar part 47 is omitted. The sample container 40 is manufactured by integral formation of a transparent or translucent synthetic resin such as polypropylene. The shape (the inner wall shape) of an opening 44 is an ellipse in a manner that two semi-circular parts 44*b* are connected to a rectangular part 44*a* as shown in (2) of FIG. 3. It is critical that an arc part of an outer surface of the ellipse is a semi-circle with a radius $R_1$, and a wall surface of the rectangular part 44*a* is formed not by curves but by straight lines. These shapes are the same from the vicinity of an upper end of a body part 41 excluding a flange part 43 to the connection region with the bottom part 42. Moreover, strictly speaking, because the sample container 40 is integrally formed by injection molding, the sample container 40 is slightly tapered in a manner that the outer shape on an upper side is slightly larger than the outer shape near the bottom part 42. In addition, a gap between the outer edge shape of the oval body part 41 and the opening 30*a* of the holding hole 30 is preferably designed to be substantially zero, but a required minimum gap is arranged in order to smoothly attach the sample container 40 to and detach the sample container 40 from the holding hole 30. The rectangular part 44*a* which is an intermediate part of the elongated hole may also be formed not by straight lines but into an arc shape slightly bulging outward in a cross-section view, but there is a disadvantage that the interval between adjacent holding holes 30 is narrowed by being arc. In addition, it is necessary to form the holding hole 30 of the rotor 2 in accordance with the shape of the sample container 40, and because the holding hole 30 is processed by cutting with a cutting tool such as a drill or the like, making the wall surface of the rectangular part 44*a* straight is more advantageous in processing the rotor 2.

The body part 41 of the sample container 40 is formed corresponding to the shape of the elongated hole of the opening 44, and the shape of the bottom part 42 is also formed accordingly. As shown in (3) of FIG. 3, a semi-cylindrical part 42*a* having a semi-cylindrical wall surface near the center as viewed in the long axis direction is formed in the bottom part 42, and a quarter spherical part 42*b* which is a quarter of a spherical surface is connected to each of the two ends. The quarter spherical part 42*b* forming the corner is shaped like a quarter of the wall surface of the sphere whose outer surface has a radius $R_3$ as shown by a diagonal hatching line at a narrow interval in (3) of FIG. 3 and is connected to the semi-cylindrical part 42*a* and a semi-cylindrical part 41*b*. As can be understood here, the body part 41 has a shape in which rectangular flat walls 41*a* (portions specified by diagonal hatching lines with coarse intervals) are formed on the left and right sides by parallel planes, and both sides in the long axis direction are connected by the semi-cylindrical parts 41*b* formed into a semi-cylindrical shape. A curvature radius of the semi-cylindrical part 41*b* is $R_1$, and a curvature radius of an outer surface of the semi-cylindrical part 42*a* is $R_2$. Here, the curvature radius $R_1$ of the outer surface of the semi-cylindrical part 41*b*, the curvature radius $R_2$ of the outer surface of the semi-cylindrical part 42*a*, and the curvature radius $R_3$ of an outer surface of the quarter spherical part 42*b* are all unified to the same curvature radius (4 mm). By unifying the curvature radii $R_1$, $R_2$, and $R_3$ in this manner, the cutting process of the holding hole 30 of the rotor 2 becomes easy, and uneven distribution of the centrifugal load concentrated on one portion of the sample container 40 can be effectively dispersed. Moreover, even if all the radii of curvature of the curved surface parts of the sample container 40 are completely matched, it is not intended to exclude tolerances required for the injection molding. As described above, the sample container 40 is formed into a flat shape, a length ratio of the long axis direction and the short axis direction of the opening 44 is changed, and the long axis direction of the sample container is arranged to be the radial direction of the rotor 2 as shown in FIG. 2, and thereby more sample containers can be set compared with the conventional cylindrical sample container.

Figure 4:
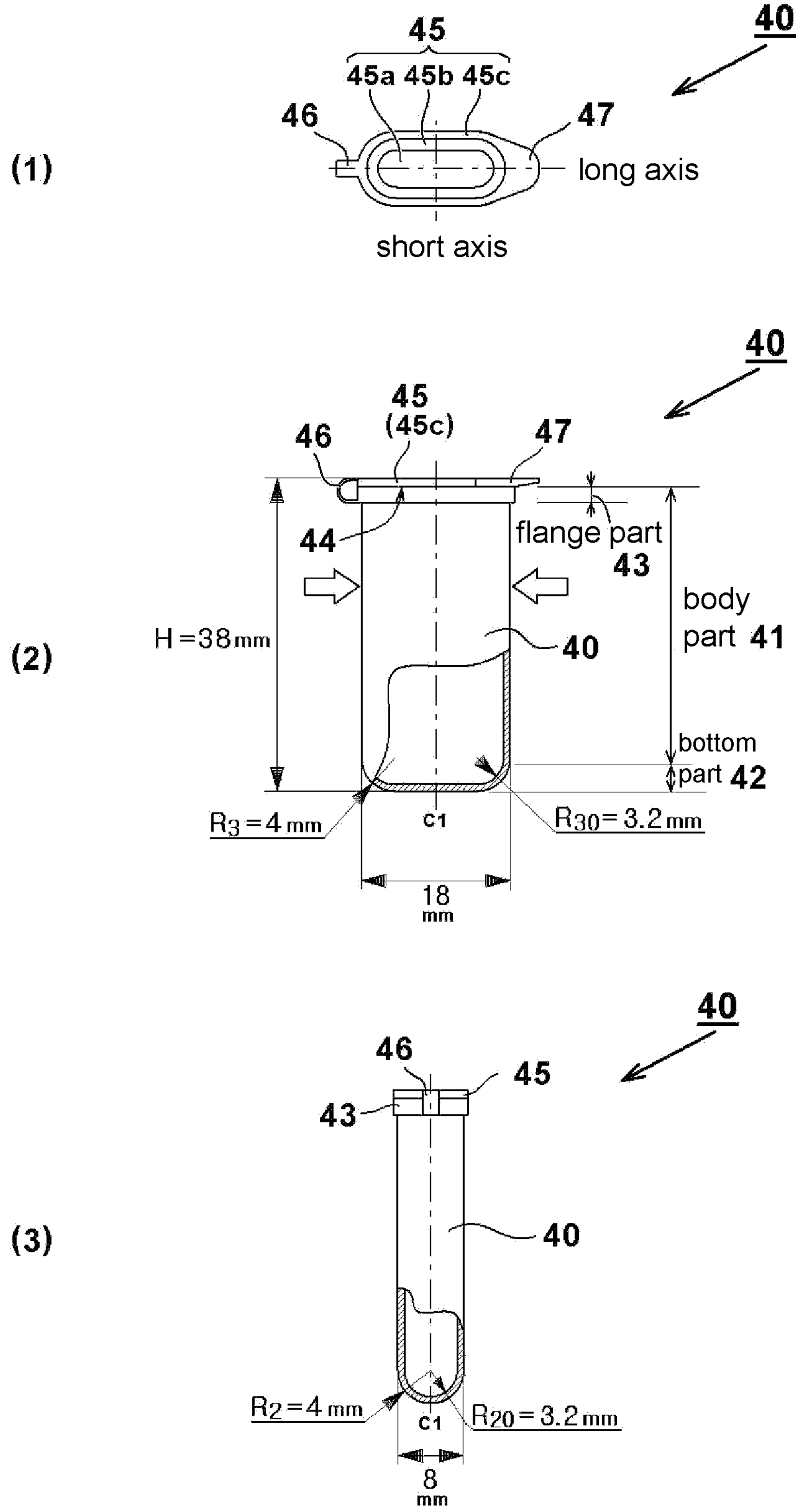
FIG. 4 shows diagrams showing an overall shape of the sample container 40 in FIG. 2, wherein (1) of FIG. 4 is a top view, (2) of FIG. 4 is a side view along a long side (a part of the cross-section view), and (3) of FIG. 4 is a side view along a short side (a part of the cross-section view).

FIG. 4 shows diagrams showing the overall shape of the sample container 40 in FIG. 2, (1) of FIG. 4 is a top view, (2) of FIG. 4 is a side view on a long side, and (3) of FIG. 4 is a side view on a short side. Here, unlike FIG. 3, the entire sample container including the lid part 45 is illustrated. The lid part 45 is manufactured by integral formation of a synthetic resin together with the body part 41, and as shown in (1) of FIG. 4, the sample container 40 has a side wall part 45*b* formed into a substantially cylindrical shape and formed into a concave shape on an inner portion of a peripheral edge abutment part 45*c* when viewed from above, and a bottom surface part 45*a* having a planar inner portion surrounded by the side wall part 45*b*. At this time, the side wall part 45*b* is in close contact with an inner wall surface of the body part 41 in the radial direction, and the peripheral edge abutment part 45*c* is in close contact with an upper edge part of the opening 44 (see FIG. 3), and thus the container is completely sealed. Furthermore, an extension part 45*d* is formed extending further downward along the inner wall surface of the body part 41 than the bottom surface part 45*a* (see FIG. 5 for details), and thus the sealing performance of the opening 44 of the body part 41 determined by the lid part 45 is enhanced. The bendable hinge part 46 that is connected to the body part 41 is formed on one side in the long axis direction of the peripheral edge abutment part 45*c*, and the collar part 47 is formed on the other side in the long axis direction in order that the operator can easily open the lid part 45 by hand.

As can be seen from (1) of FIG. 4, the hinge part 46 and the collar part 47 connected to the lid part 45 have characteristic appearance shapes, and it is obvious at a glance which of the long axis directions is the collar part 47 when viewed from above. Therefore, when the operator grips the sample container 40 with one hand, positioning in the long axis direction is easy, and the collar part 47 can be moved upward with the other hand to open the lid part 45. In addition, due to the characteristic upper surface shape, after the sample is injected into the sample container 40 and the lid part 45 is closed, it is also easy to set the sample container 40 with respect to the rotor 2 in a predetermined orientation (an orientation in which the hinge 46 is positioned on the outer peripheral side of the rotor 2). Furthermore, because aspect ratios of the length in the long axis direction and the length in the short axis direction of the sample container 40 are different, the sample container 40 can be reliably prevented from self-rotating inside the holding hole during the centrifugal separation operation, and the change in the position of the sediments can be reliably avoided.

(2) and (3) of FIG. 4 are side views of the sample container 40. As shown in (2) of FIG. 4, in the sample container 40, because the flat sample container 40 keeps substantially the same elliptical cross-section shape from the opening 44 serving as the injection hole to the bottom part 42, a shape of a side surface in a long side is a substantially wide rectangular shape. When gripping the sample container 40, the operator grips a short side surface with two fingers in a direction indicated by a white arrow. Because rigidity of the sample container 40 is high with respect to the pressing in the direction indicated by the white arrow, a phenomenon that the sample inside is pushed out due to deformation of the sample container 40 can also be avoided. The corner of the bottom surface of the sample container 40, that is, the cross-section shape at both ends of the bottom part 42, has a curvature radius $R_3$ of the outer surface of 4 mm. Therefore, because the cross-section shape at both ends of the bottom part 42 is the same as the shape of a bottom inner surface of the holding hole 30 except for the tolerance and the allowable gap for smooth mounting, the centrifugal load on each part of the sample container 40 is effectively received by the holding hole 30, the centrifugal load can be prevented from being excessively concentrated on a specific place of the sample container container 40, and risk of damage to the sample container 40 can be greatly reduced. A curvature radius $R_{30}$ of the inner surface of the cross-section shape at both ends of the bottom part 42 is 3.2 mm. Here, the wall thickness of the sample container 40 is set to mm; however, the wall thickness can be set optimally in consideration of strength required for the sample container 40, a material of the sample container 40, and the like.

The flange part 43 extending radially outward is formed on an outer edge of the upper end of the body part 41 to engage with an opening edge of the holding hole 30 of the rotor 2 and/or to improve rigidity. The flange part 43 is formed to project radially outward to increase a difference between the outer diameter and the inner diameter, and has a wall thickness of, for example, about 1.0 to 1.5 mm. Above the flange part 43, the lid part 45 for preventing leakage of the sample is arranged. The lid part 45 is connected to the flange part 43 by the flexible hinge part 46 that can be bent into a U-shape or expand into a flat surface. The collar part 47 formed on the side opposite to the hinge part 46 in the long axis direction has a shape extending radially outward from the flange part 43. In the lid part 45, an inner portion of the peripheral edge abutment part 45*c* abuts against an inner wall portion of the body part 41. In the diagram, actual dimensions when the sample container 40 has a capacity of two milliliters are shown. It is critical for the sample container 40 rotated at a high speed that the outer surface shape of the sample container 40 matches the inner wall shape of the holding hole 30 of the rotor 2. Because the centrifugal load can be received in a wide range of the inner surface of the holding hole 30 by matching the shapes in this manner, increase in the plate thickness of the sample container 40 can be avoided. Here, a height H of the sample container 40 is 38 mm, a total width in the long axis direction of the body part 41 is 18 mm, and a total width in the short axis direction is 8 mm. The curvature radius R 1 of the outer peripheral surface of the body part 41 (see (2) of FIG. 3) is 4 mm, and the curvature radius $R_3$ of the outer surface of the quarter spherical part is also 4 mm. As shown in (3) of FIG. 4, the curvature radius $R_2$ of the outer surface of the semi-cylindrical part near substantially the center in the long axis direction of the bottom part 42 is also 4 mm.

As described above, in the example, as a result of changing the aspect ratios of the flat sample container 40, when the sample container is manufactured with the same capacity and the same height as the conventional sample container 140 (see FIG. 13), the width of the sample container 40 in the circumferential direction of the rotor 2 can be reduced. In particular, the smallest interval d with the adjacent holding hole 30 in the rotor 2 is configured to be smaller than the length (here, 8 mm) of the holding hole 30 in the short axis direction. Therefore, by reducing the total width in the short axis direction, the total number of the sample containers that can be mounted on the rotor can be increased as compared with before.

Figure 5:
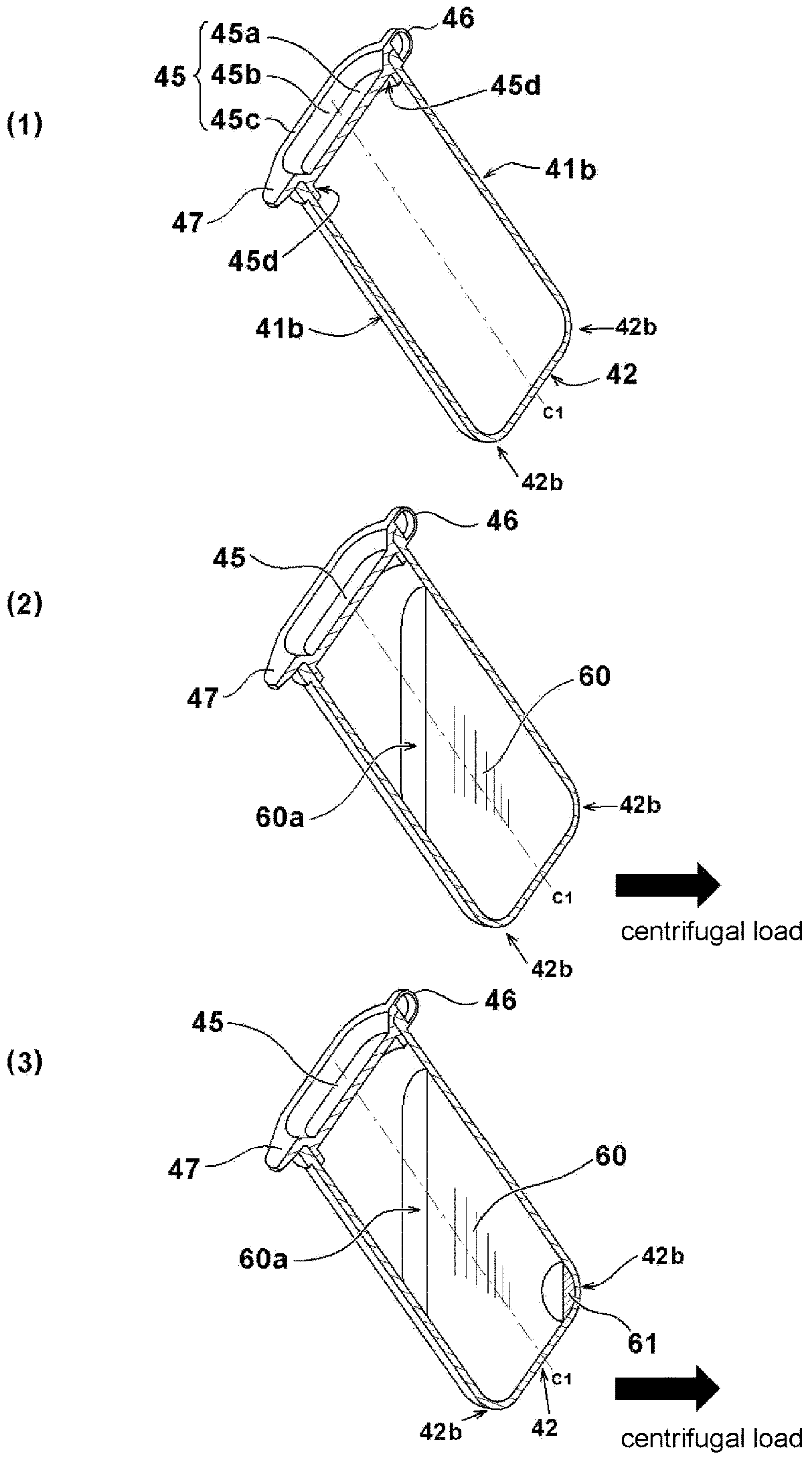
FIG. 5 shows cross-section perspective views for illustrating a deposition situation of pellets (sediments) in the sample container 40 in FIG. 2, wherein (1) of FIG. shows a situation before a sample is put into the sample container 40, (2) of FIG. 5 shows a situation during centrifugation operation with the sample put in, and (3) of FIG. 5 shows a state that pellets (sediments) are being deposited just before the end of the centrifugal separation.

FIG. 5 shows cross-section perspective views for illustrating the deposition situation of the pellets (the sediments) in the sample container 40. (1) of FIG. 5 shows a situation before a sample is put inside. In addition, in this diagram, the central axis in the longitudinal direction of the sample container 40 is illustrated obliquely in accordance with the angle (the inclination angle=45 degrees) of the holding hole 30 of the angle type rotor 2. When the centrifugal separation is performed, the sample 60 is injected inside. (2) of FIG. 5 shows the degree of deviation of the sample 60 when the rotor 2 is rotated at a high speed, the sample 60 is moved to the outer peripheral side by the rotation of the rotor 2, and a liquid surface 60*a* is parallel to the rotation axis A1 (see FIG. 2) of the rotor 2. An amount of the sample 60 to be added is arbitrary, and here a state is shown in which the sample 60 is injected up to the rated capacity of the sample container 40, that is, two milliliters. (3) of FIG. 5 shows a state in which the centrifugal separation operation proceeds and pellets 61 are deposited on one side of the bottom part 42. In the two quarter spherical parts 42*b*, the one on the side positioned on one side of the bottom part 42, that is, the side where the flexible hinge part 46 is provided, is an aggregation part of the sample accommodated in the sample container 40. Because the quarter spherical part 42*b* positioned on the outer peripheral side is a position where a rotation radius is the largest and forms an aggregation part, the pellets 61 are always deposited at that position. Moreover, the curvature radius $R_{30}$ (see (2) of FIG. 4) of the quarter spherical part 42*b* positioned on the outer peripheral side is smaller than that of the conventional cylindrical sample container 140 having the same capacity. Therefore, even when the same amount of the pellets is accumulated, an accumulation status is different, and a deposition height of the pellets is high. This state is described using FIG. 6.

Figure 6:
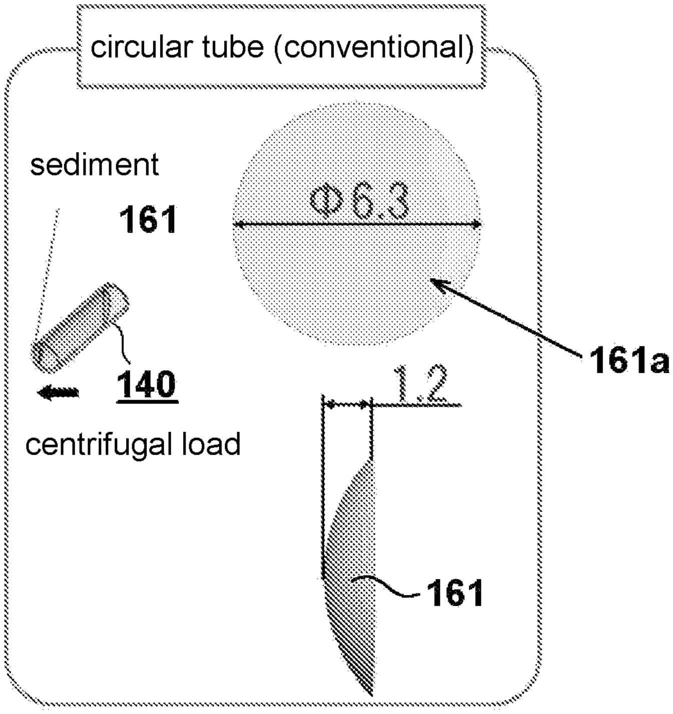
In FIG. 6, wherein (1) of FIG. 6 is a diagram showing a conventional cylindrical sample container, and (2) of FIG. 6 is a diagram showing a sedimentation state of sediments in a flat sample container of the present invention.
Figure 6:
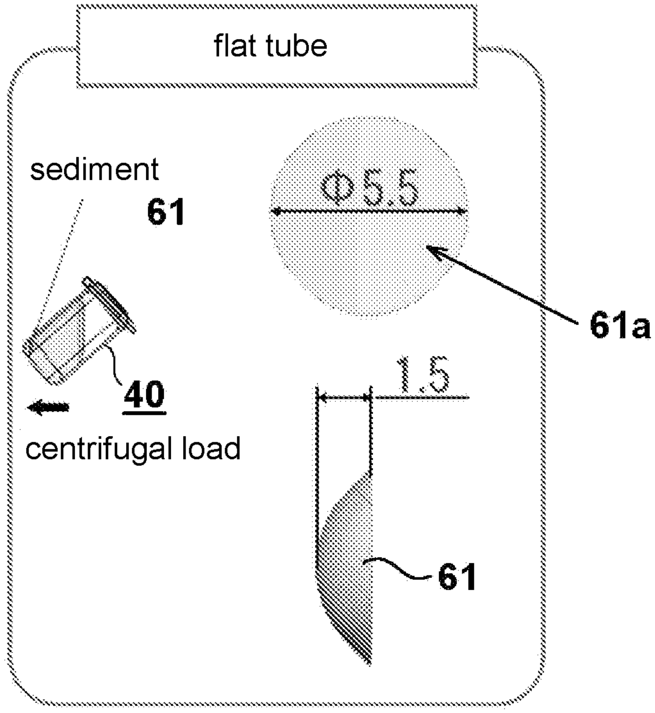

(1) of FIG. 6 is a diagram showing a state in which the sediments are collected using the conventional cylindrical sample container, and (2) of FIG. 6 is a diagram showing a sedimentation state of the sediments in the flat sample container 40 of the present invention. The same amount of the same sample is added into the conventional cylindrical sample container 140 and the flat sample container 40 of the example and the centrifugal separation is performed. Here, as shown on the left side in (1) of FIG. 6, in the conventional cylindrical sample container 140, the sediments 161 deposit on a part of the hemispherical bottom surface as shown in the diagram. A shape 161*a* of the sediments 161 viewed radially outward from the radial center is shown in the diagram on the upper right, and the shape viewed from the circumferential direction is shown in the diagram on the lower right. A hemispherical bottom of the sample container 140 has an inner curvature radius of 4.5 mm, and the sediments 161 have a depth of, for example, 1.2 mm in the radial direction. At this time, a boundary surface between the supernatant and the sediments has a diameter of 6.3 mm.

As shown in (2) of FIG. 6, when the centrifugal separation is performed in the sample container 40 of the example, because the inner curvature radius of the quarter spherical part 42*b* is as small as 3.2 mm (see FIG. 4), even when the amount of the sediments 61 is exactly the same as that of the sediments 161, a depth in the radial direction is as deep as 1.5 mm and the diameter of the boundary surface with the supernatant is 5.5 mm, which is smaller than 6.3 mm in the conventional example. Therefore, because the sediments accumulate in a deeply deposited state in the outer quarter spherical part 42*b* serving as the aggregation part, in the case of the same amount of sediment 61, the deposition height of the sediments 61 increases, and thus improvement in the visibility can be expected, and the work at the time of pellet recovery became easier.

As described above, when the rotor 2 and the sample container 40 of the example are used, the sediments can be intensively accumulated at one end side corner (the aggregation part) at the bottom of the sample container. In addition, because the hinge part 46 of the lid part 45 is formed on one side of the long axis of the upper opening of the sample container 40, if the hinge part 46 is set to the rotor 2 on the outer peripheral side, regardless of the orientation of the sample container 40 after removal, which side the sediments 61 are accumulated on can be easily identified based on the position of the hinge part 46, and thus the efficiency of the collection work of the sediments 61 is greatly improved. Furthermore, if the hinge part 46 is set to the outer peripheral side of the rotor, an instrument such as a dropper and the like can be inserted from a side that is greatly opened when the lid part 45 is opened (the collar part 47 side), and thus the insertion of the instruments such as a dropper and the like is also easy. Furthermore, because the length of the opening 44 in the long axis direction of the sample container 40 is larger than that of the conventional sample container 140, the instrument such as a dropper and the like can be greatly inclined inside the sample container 40, and a movable range thereof increases, and thus the collection work of the sediments 61 is facilitated. Moreover, although the sample container 40 of the example has a small size with a capacity of about two milliliters, the capacity of the sample container is not limited hereto, and a sample container of about several tens of milliliters may be applied. However, when the present invention is applied to a small sample container having a rated capacity of less than 20 milliliter, the effect can be particularly exhibited.

Example 2

Figure 7:
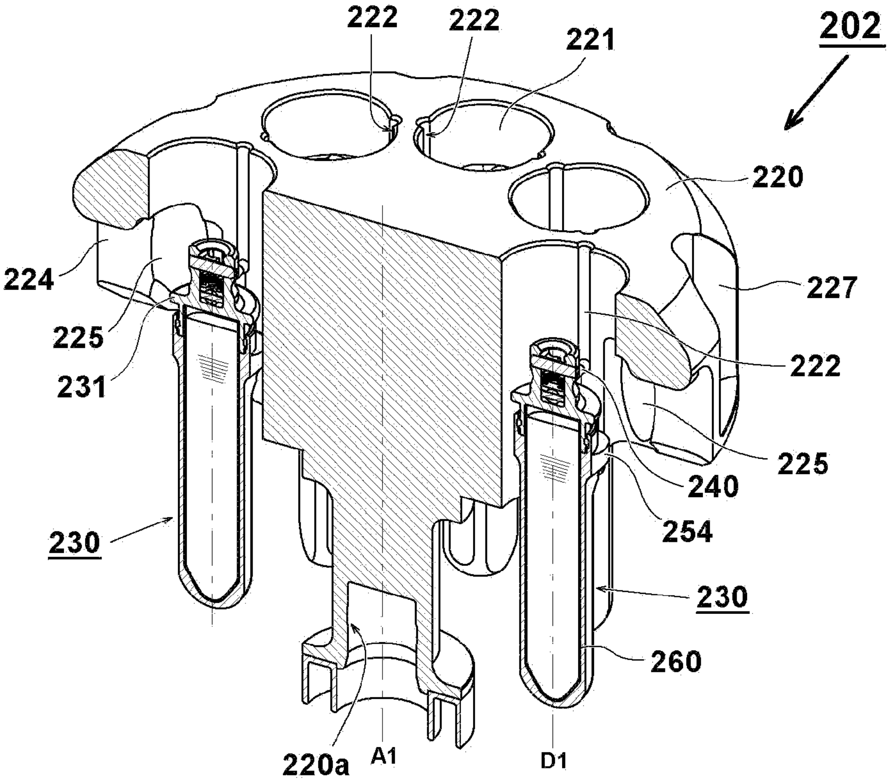
FIG. 7 is a cross-section perspective view showing a state in which a swing rotor 202 according to a second example of the present invention is stationary.

Next, a second example in which a non-cylindrical sample container is used for a swing-rotor type centrifuge is described with reference to FIGS. 7 to 11. FIG. 7 is a cross-section perspective view showing a state that a swing rotor 202 according to the second example of the present invention is stationary. In FIG. 7, a state is shown in which the swing rotor 202 is stopped and a longitudinal direction of a bucket 230 is a vertical direction. The bucket 230 is closed by a lid part on which a rotation axis 240 is formed and a synthetic resin tube (sample container) 260 can be mounted inside. The swing rotor 202 can be mounted instead of the rotor 2 in the centrifuge 1 shown in FIG. 1. However, in the case of the swing rotor 202, because heat is generated easily due to the resistance (windage loss) of wind in rotation as the rotation speed increases, the rotor chamber 4 is more preferably used in an environment in which the pressure is reduced using a vacuum pump which is not shown.

A through hole 221 for mounting the bucket 230 is formed from an upper surface of the swing rotor 202 downward. On both sides in the circumferential direction of the plurality of through holes 221 arranged at equal intervals in the circumferential direction, rotation axis engagement grooves 222 having a lower end (bottom) from the upper side to the lower side are formed respectively. The bucket 230 is held in a manner that both ends of a rotation axis 240 extending in a left-right direction (details are described later using FIG. 8) abuts against a lower end (not shown) of a rotation axis engagement groove 222, and is held at an illustrated position without falling down through the through hole 221 of the swing rotor 202 to a lower side. At this time, the bucket 230 has no contact with the swing rotor 202 except for both ends of the rotation axis 240. If the motor 12 (see FIG. 1) is activated from this state to rotate the swing rotor 202, the bucket 230 swings radially outward due to a centrifugal force taking the rotation axis 240 as a rotation axis. The swing of the bucket 230 continues until a longitudinal direction D1 of the bucket 230 changes from a vertical direction to a substantially horizontal direction (transverse direction), and a notch part 224 is formed in an outer part of the bucket 230 of the swing rotor 202 in order that the swing operation of the bucket 230 is not hindered at this time. The notch part 224 is a portion obtained by cutting a lower end of the swing rotor 202 into an inverted U-shape in a side view, and when the bucket 230 swings, only a specific place of the bucket 230 (a seating surface described later) comes into contact with a seating surface 225 of the swing rotor 202, and the bucket 230 and the swing rotor 202 do not contact with each other in other portions.

Figure 8:
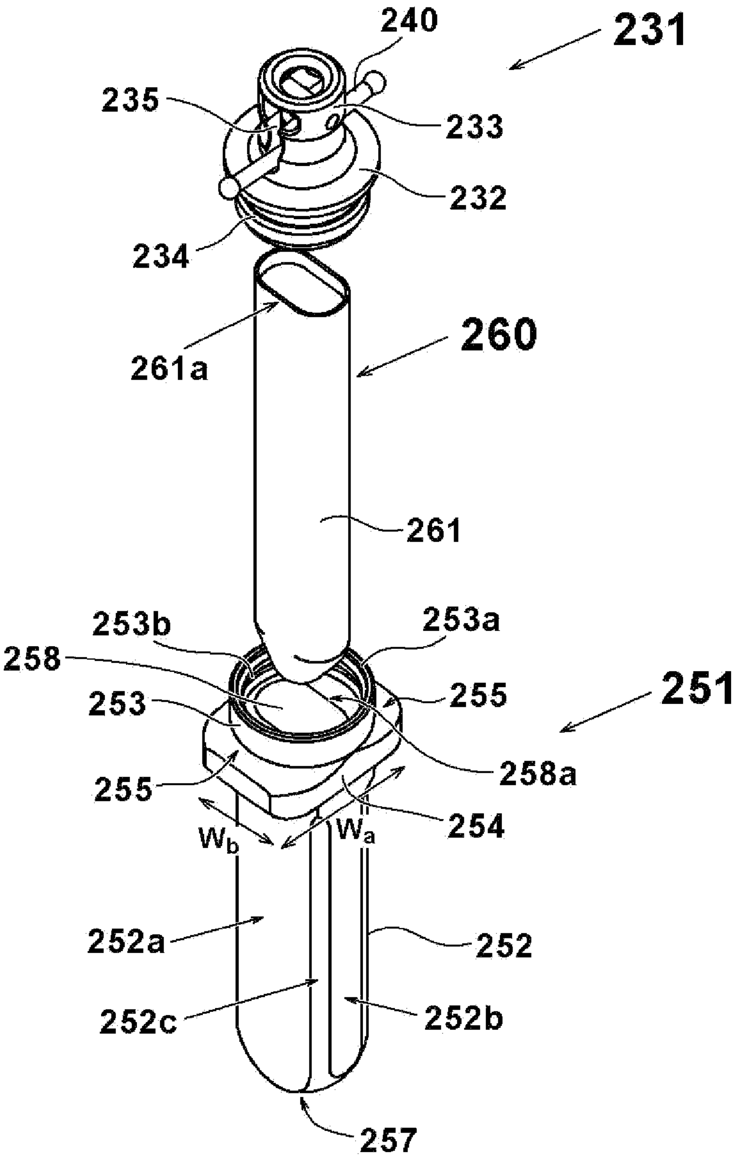
FIG. 8 is a perspective view showing the shape of a bucket 230 in FIG. 7 and a tube 260 accommodate in the bucket 230.

FIG. 8 is an exploded perspective view showing an external shape of the bucket 230 according to the example of the present invention. The bucket 230 is configured by a lid part 231 and a container part 251. Inside the bucket 230, a tube 260 for containing a sample to be separated is accommodated. Because a tubular part 252 of the container part 251 is integrally manufactured by cutting a metal having a high specific strength (for example, a titanium alloy), in the example, an outer shape of a cross section perpendicular to the longitudinal direction is not perfectly circular but is a flat outer shape that is obtained by cutting off two opposing surfaces of the cylindrical shape and making the cylindrical shape thinner. The cylindrical part 253 is formed above the container part 251. An opening 253*a* of the cylindrical part 253 is perfectly circular and has a female screw 253*b* formed in an inner peripheral surface. A flange part 254 that expands in the radial direction is formed below the cylindrical part 253. The flange part 254 has shoulder parts 255 expanding radially outward from the cylindrical part 253 and is connected to sides 254*a* and 254*b* (see FIG. 10 described later) of the flange part 254. A lower surface side of the flange part 254 is a seating surface 256 (described later in FIG. for contacting the seating surface 225 (see FIG. 7) formed adjacent to an inner peripheral side of the notch part 224 of the swing rotor 202. A lower part of the flange part 254 is connected to an upper end of the tubular part 252, and a bottom part 257 is formed at a lower end of the tubular part 252. Preferably, a packing not shown for keeping the inside of the bucket 230 airtight is arranged between the lid part 231 and the container part 251. The packing may be arranged on either the lid part 231 or the container part 251. Here, the shape of a container part 351 of a conventional bucket used in the conventional swing rotor is described for comparison using FIG. 14.

Figure 14:
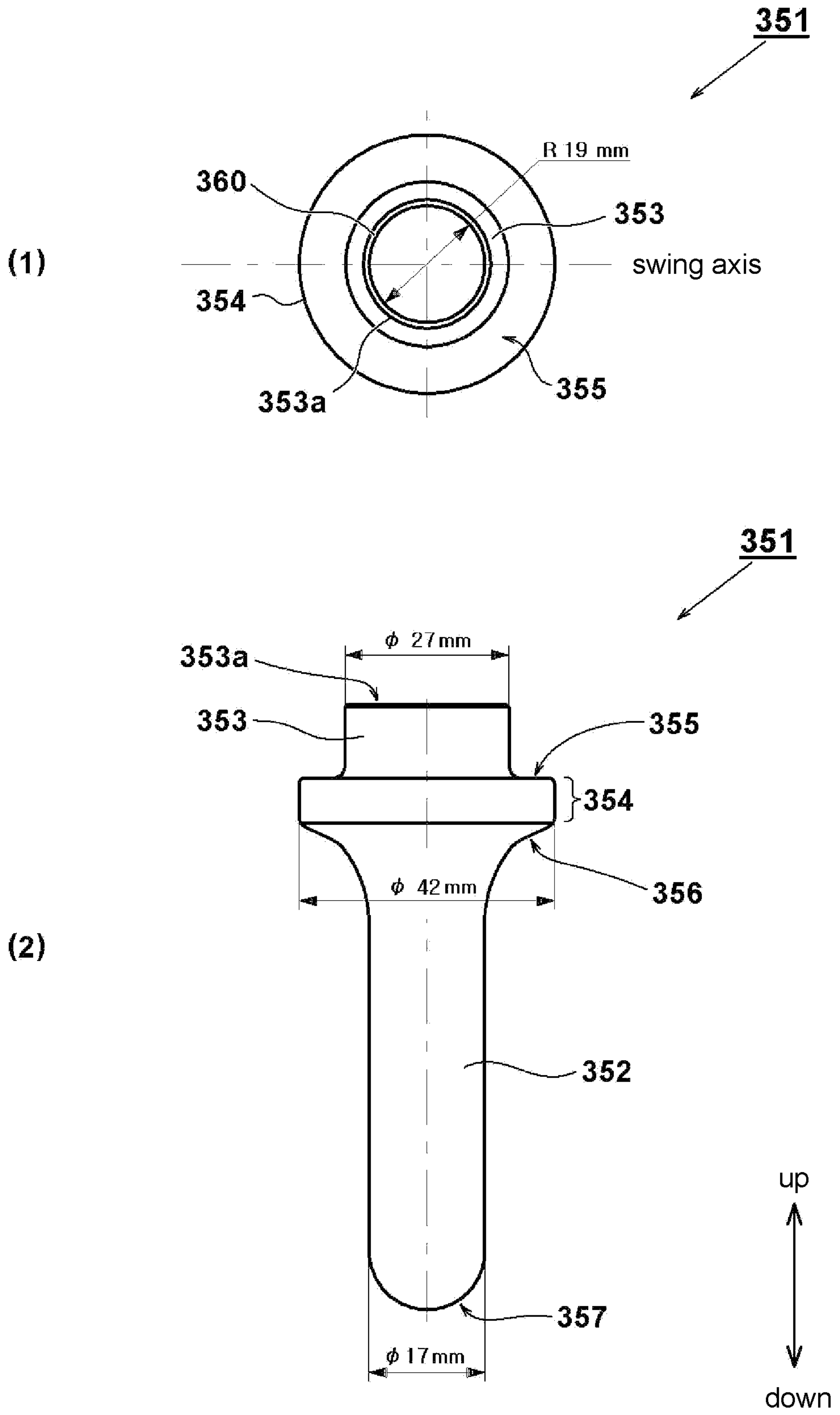
FIG. 14 (RELATED ART)
FIG. 14 shows diagrams showing the shape of a container part 351 of the conventional sample container, wherein (1) of FIG. 14 is a top view, and (2) of FIG. 14 is a side view.

(1) of FIG. 14 is a top view of the container part 351 of the conventional bucket, and (2) of FIG. 14 is a side view. The container part 351 has an outer shape and an inner shape having a perfectly circular cross section, and a perfectly circular opening 353*a* is formed above the container part 351. The lid part 231 shown in FIG. 8 is the same as that used for the conventional bucket except for the axial length of the rotation axis 240. Accordingly, the cylindrical part 353, the opening 353*a* thereof, and the female screw formed on an inner peripheral side of the cylindrical part 353 have the same dimensions and the same shape as the cylindrical part 253 of the container part 251 shown in FIG. 8, and an outer diameter of the cylindrical part 353 is 27 mm. In the conventional container part 351, a flange part 354 is formed below the cylindrical part 353; as for the shape of the flange part 354, the top view of an outer edge shape is perfectly circular as is apparent from (1) of FIG. 14. An upper side of the flange part 354 is a plane annular part 355, and a lower side is formed with a seating surface 356 having an outer diameter gradually decreasing from an outer edge of the flange part 354. In an internal space of the container part 351, a holding hole having a perfectly circular cross section is formed in order to accommodate a cylindrical tube (a sample container) 360 having an inner diameter of 19 mm. A bottom part 357 serving as a lower end of the cylindrical part 352 is closed by a hemispherical wall surface.

With reference to FIG. 8 again, in the example, similarly to the sample container 40 shown in the first example, the tube 260 accommodated inside the bucket 230 has a flat shape in which the cross-section shape of the portion excluding the bottom is elliptical. An opening 261*a* of the tube 260 is also elliptical. An outer edge shape of the flange part 254 of the container part 251 is not a round shape as before but a substantially rectangular shape having long sides and short sides with different lengths when viewed from above, and a width $W_b$ on the short side is narrower than a width $W_a$ on the long side.

The lid part 231 functions as sealing means for sealing an internal space of the tubular part 252, and is attached to the female screw 253*b* of the cylindrical part 253 by screw connection. When the attachment is completed, the axis direction of the rotation axis 240 may be specified at a position to which the long axis direction of an elliptical opening 258*a* of the container part 251 is orthogonal. A disk-shaped disk part 232 serving as a lid body of the container part 251 is formed near the center in the vertical direction of the lid part 231. A cylindrical portion (a hollow part 233) is formed above the disk part 232, and an elliptical through hole 235 for the rotation axis 240 to pass through is arranged on a side of the hollow part 233, and the rotation axis 240 is arranged which projects in a radial direction opposite to the hollow part 233 via the through hole 235. The through hole 235 has an elongated shape extending in a direction in which a centrifugal load is applied, and the rotation axis 240 is configured to be able to move in parallel within the long hole toward a central axis direction of the bucket 230.

The lid part 231 is manufactured by, for example, cutting metal such as an aluminum alloy or the like, and a male screw 234 described later is formed below the disk part 232. The rotation axis 240 is engaged with the rotation axis engagement groove 222 formed in the swing rotor 202 and plays a role of supporting the load of the bucket 230 before the bucket 230 swings to reach a horizontal state and be seated. A plurality of disc springs (not shown) are arranged above the rotation axis 240 and inside the hollow part 233, and the rotation axis 240 is energized so as to be positioned near a lower end of the elliptical through hole 235. When the swing rotor 202 rotates and the bucket 230 swings to the horizontal position and a rotation speed further rises, the bucket 230 moves toward the radial outer side of the swing rotor 202 in a manner that the disc springs shrink due to the centrifugal load, and the rotation axis 240 relatively moves horizontally upward inside the elliptical through hole 235. As described above, when the bucket 230 swings in the horizontal direction and then relatively moves slightly toward the radial outer side, the seating surface 256 (described later with reference to FIG. 10) formed on a lower surface of the flange part 254 is in good surface contact with the seating surface 225 of the notch part 224. The contact state is called “seating”, and even if the rotation speed of the swing rotor 202 further increases from the seating state, the centrifugal load of the bucket 230 is stably supported by the seating surface 225.

Inside the container part 251, a holding hole 258 for inserting the tube 260 is formed. Because the conventional sample container for swing rotor has a cylindrical tube mounted therein, the shape of the upper opening is also round-shaped. In the example, because the cross-section shape perpendicular to the longitudinal direction is a non-circular shape that is not a perfect circle, that is, an elliptical shape, the shape of the opening 253*a* is also elliptical.

Figure 9:
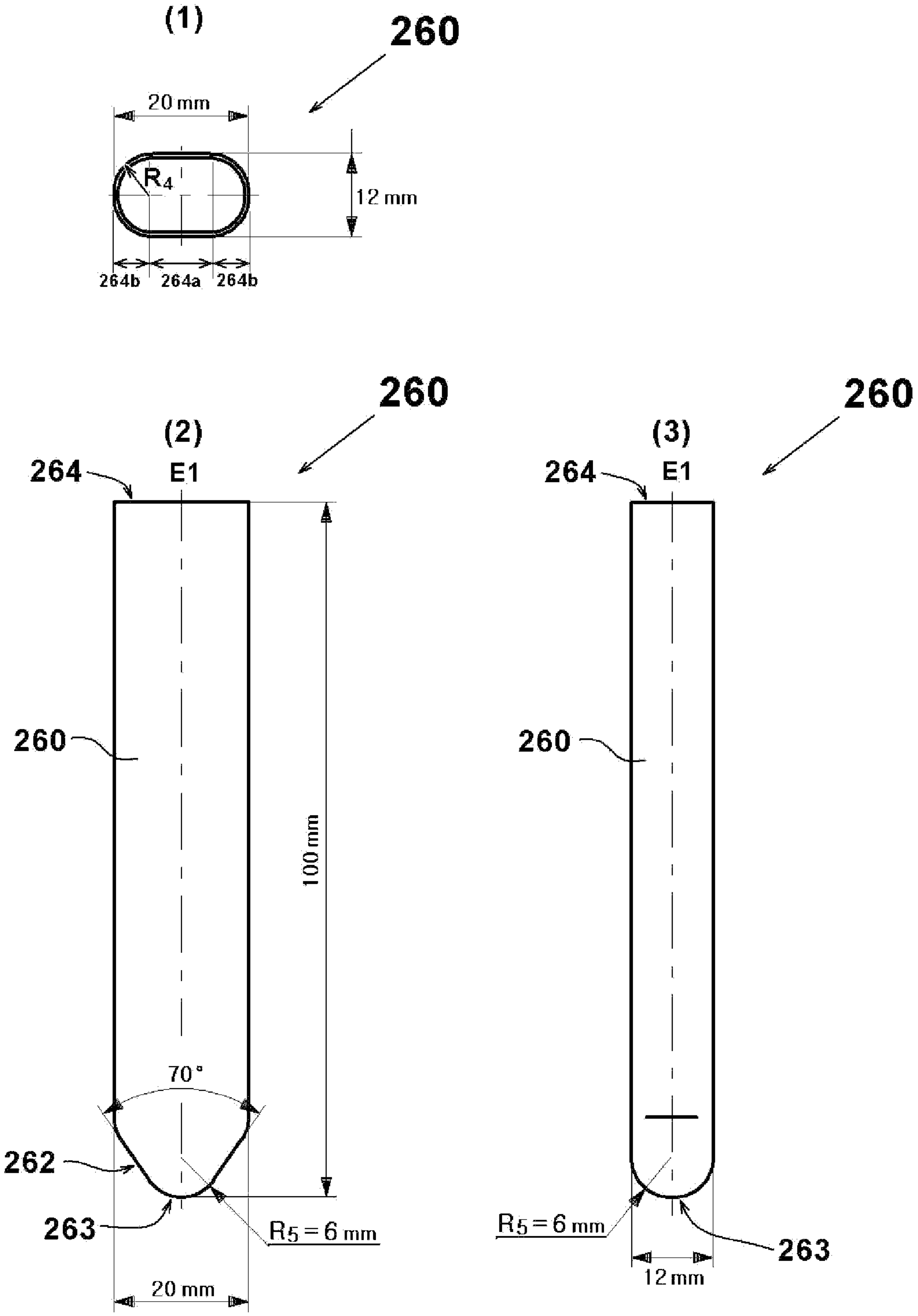
FIG. 9 shows diagrams showing the shape of the tube 260 in FIG. 7, wherein (1) of FIG. 9 is a top view, (2) of FIG. 9 is a side view on a long side, and (3) of FIG. 9 is a side view on a short side.

FIG. 9 are diagrams showing the shape of the tube 260, (1) of FIG. 9 is a top view, (2) of FIG. 9 is a side view on a side of a long side part, and (3) of FIG. 9 is a side view on a side of a short side part. The shape of an opening 264 in the top view in (1) of FIG. 9 is not perfectly circular but elliptical, the same as the sample container 40 of the first example. The shape of the opening 264 is an ellipse in which two semi-circular parts 264*b* are connected to parallel parts 264*a*. It is critical that an arc part of the ellipse is a semicircle with a radius $R_4$ and that the parallel part 264*a* is formed not as a curve but as a straight line. These shapes are substantially the same from an upper end of a body part 261 to a connection region to a bottom part 263. Because the tube 260 is manufactured by integral formation of a synthetic resin such as polypropylene or the like, in order to be detachable from a mold after the injection molding, the body part 261 has a slightly larger outer shape at the upper end side and the outer shape becomes smaller toward a lower end. The shape on the bottom part 263 side is a semi-circular shape when viewed from the short side shown in (3) of FIG. 9 and is a triangular shape having a narrowing part 262 when viewed from the long side shown in (2) of FIG. 9, with only the front-end portion of the narrowing part 262 formed into a semi-circular shape. Accordingly, an inner bottom surface of the tube 260 viewed as a whole becomes hemispherical. In FIG. 9, an example of the dimensions is illustrated, and when the width on the side of the short side part is 12 mm, the width on the side the long side part is 20 mm, the height of the tube 260 is 100 mm, and the wall thickness is 0.8 mm, the capacity is 18 milliliters. A curvature radius $R_5$ of an outer surface of the hemispherical portion (the bottom part 263) at the front-end is 6 mm. The curvature radius $R_5$ is equal to the curvature radius $R_4$ of the outer surface of the opening 264 as shown in (1) of FIG. 9. Because the curvature radius $R_4$ of the opening of the tube 260 and the curvature radius $R_5$ at the front-end are both 6 mm, when the holding hole 258 of the bucket 230 is processed by machine, a drill or a cutting tool having the same diameter may be used, and thus productivity is improved.

Figure 10:
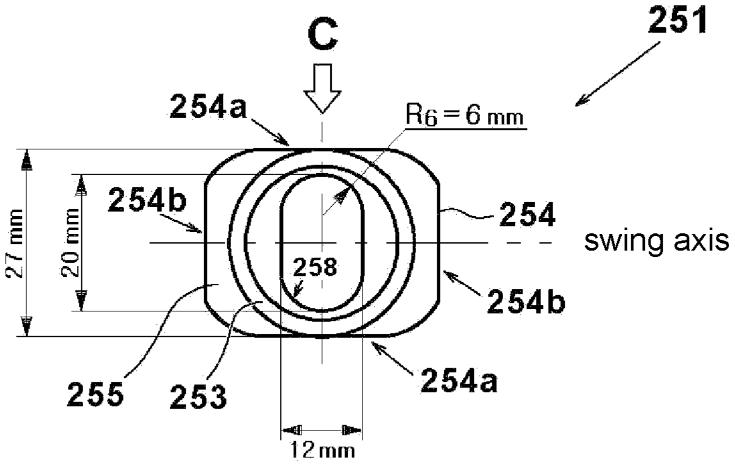
In FIG. 10, wherein (1) of FIG. 10 is a top view of a container part 251 in FIG. 8, and (2) of FIG. 10 is a side view of a holding hole 258 viewed from a long axis side (a direction C in the diagram).
Figure 10:
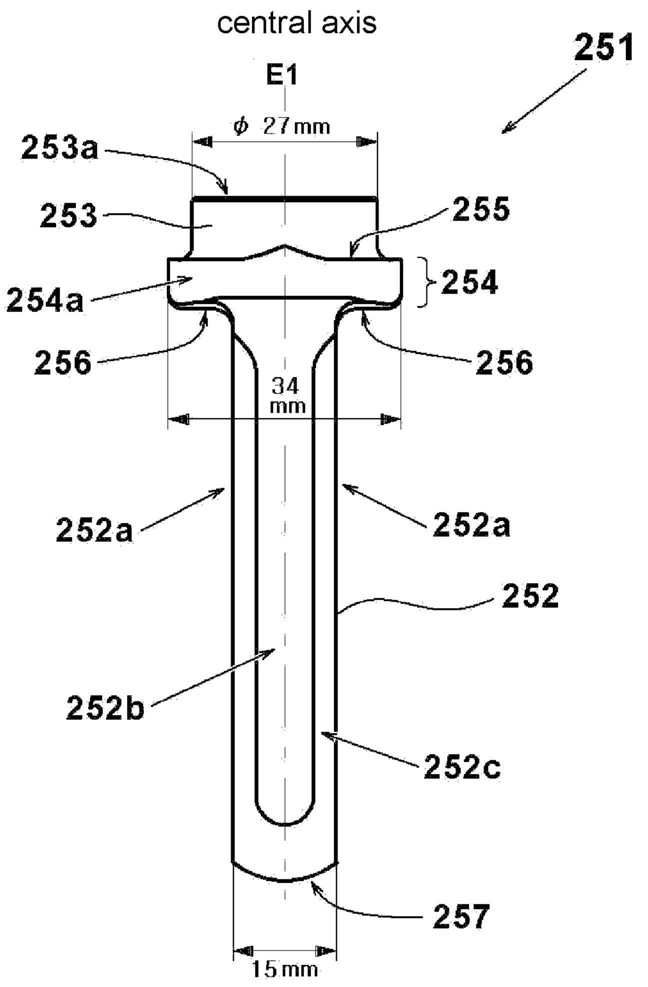

Next, an outer shape of the container part 251 of the bucket 230 is described using FIG. 10. (1) of FIG. 10 is a top view of the container part 251, and (2) of FIG. 10 is a side view of the holding hole 258 viewed from a long axis side (a direction C in the diagram). In (1) of FIG. 10, the flange part 254 of the container part 251 is formed with two long side parts 254*a* parallel to a swing axis that matches the axis direction of the rotation axis 240 and two short side parts 254*b* orthogonal to the swing axis. Corners of the long side parts 254*a* and the short side parts 254*b* are rounded off into an arc shape, and thereby the operator can easily grip the flange part 254. An outer surface shape and dimensions of the flange part 254 can also be achieved by cutting off the round container part 351 shown in FIG. 14 by a cutting process. When an outer peripheral part of the flange part 354 of the conventional container part 351 is chamfered, a substantially rectangular flange part 254 as viewed from above can be formed, which is rounded off into an arc shape. The holding hole 258 having an elliptical cross-section shape is formed on the inner peripheral side of the container part 251 by a cutting process. The holding hole 258 is shaped to be in close contact with the outer diameter shape of the tube 260. At this time, a fixation position of the container part 251 with respect to the lid part 231 is determined in a manner that the long axis direction of the ellipse of the holding hole is orthogonal to the swing axis direction and the short axis direction is parallel to the swing axis.

In (2) of FIG. 10, the shoulder parts 255 above the flange part 254 have a substantially flat shape. On the other hand, different from the seating surface 356 formed into an arc shape as shown in (2) of FIG. 14, the seating surface 256 on the lower surface side of the flange part 254 is formed into a plane shape orthogonal to a central axis E1. The width of the long side part 254*a* of the flange part 254 is 34 mm, and the width is smaller than the width of 42 mm of the flange part 354 shown in (2) of FIG. 14. In addition, the tubular part 252 is also chamfered by cutting off two places opposing each other in the swing axis direction, and thereby opposing parallel plane surface parts 252*a* are formed. Furthermore, opposing parallel plane surface parts 252*b* are formed on the side orthogonal to the swing axis direction of the tubular part 252. Portions left uncut by the four plane surface parts 252*a* and 252*b* in total become arc surfaces 252*c*, and an outer edge position of the arc surface 252*c* is integrated with the outer peripheral surface of the cylindrical part 352 shown in FIG. 14. Moreover, in the example, the outer surface of the tubular part 252 is configured to have two plane surfaces parallel to each other in the swing axis direction (a first direction) and the direction orthogonal to the swing axis direction (a second direction), but it is not required to arrange two sets of plane surfaces, and only the plane surface set on one side, for example, the plane surface parts 252*a* may be formed and the formation of the plane surface parts 252*b* may be omitted.

As described above, in the bucket 230 according to the second example, the shape of the holding hole 258 of the container part 251 is formed into a flat shape to match the tube 260, and the outer edge part is cut to make the outer diameter non-circular and narrow the width. Besides, because the width of the container 251 in the swing axis direction (the rotation direction of the swing rotor 202) is narrowed, a circumferential width of the notch part 224 of the swing rotor 202 shown in FIG. 7 can be reduced. As a result, six through holes 221 formed in the circumferential direction in the conventional swing rotor can be increased to eight.

Figure 11:
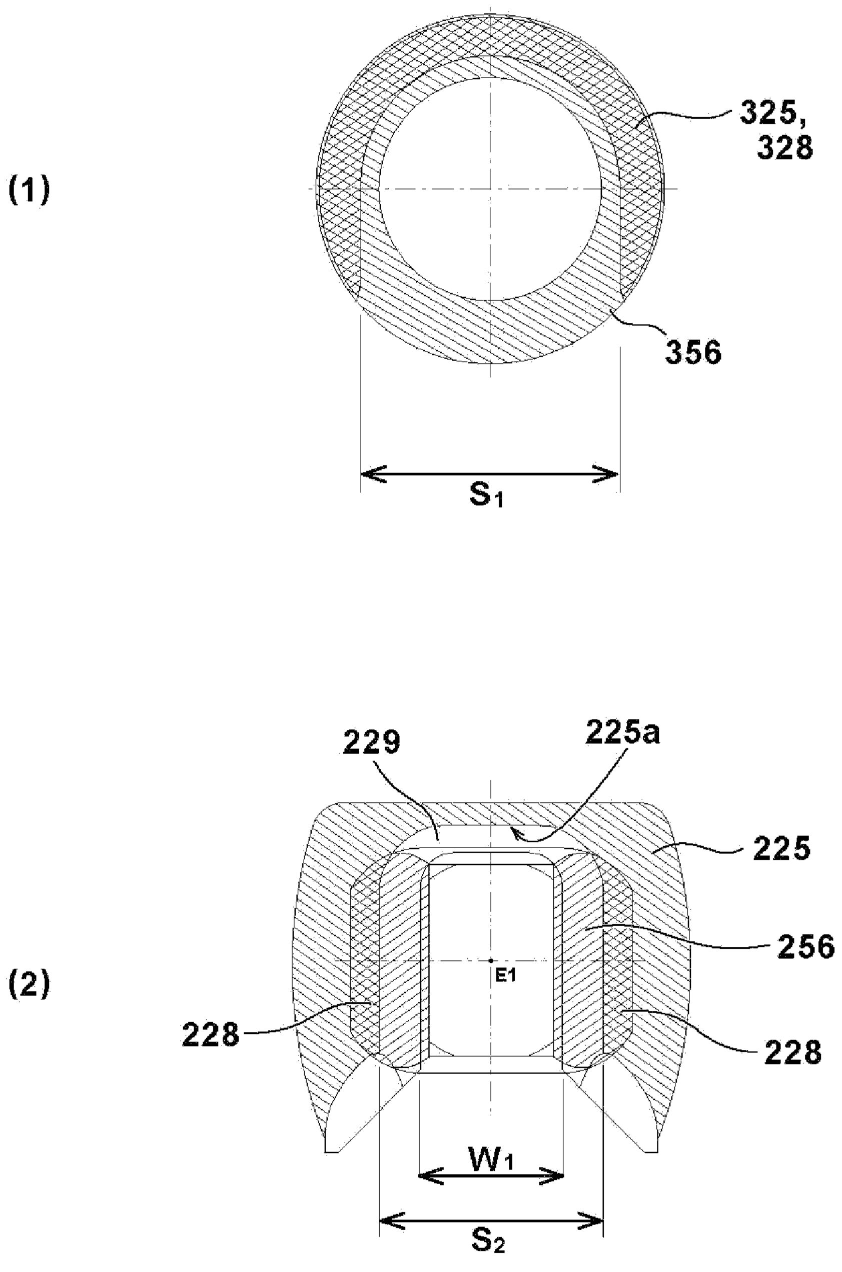
FIG. 11 shows diagrams for illustrating a situation of seating the sample container in FIG. 7 on the rotor, wherein (1) of FIG. 11 shows a seating position in the conventional cylindrical sample container, and (2) of FIG. 11 shows a seating position in the bucket 230 according to the second example.

FIG. 11 shows diagrams for illustrating the seating situation of the bucket and the swinging rotor, (1) of FIG. 11 is a diagram showing the seating position of the conventional cylindrical bucket, and (2) of FIG. 11 is a diagram showing the seating position in the bucket 230 according to the second example. In the conventional bucket, as shown in the seating surface 356 of FIG. 14, the seating surface 356 narrowed down in an arc shape in a side view is formed. Therefore, an intersection portion of the seating surface 356 (a portion applied with diagonal hatching from upper left to lower right) and the seating surface 325 (a portion applied with diagonal hatching from upper right to lower left) formed on the swing rotor, that is, a cross-hatched horseshoe-shaped portion becomes a contact region 328. However, even if the contact region 328 is a horseshoe shape, the seating surface 356 in (2) of FIG. 14 has a taper shape and the shape of the seating surface 325 on the swing rotor side is also formed to match the seating surface 356, and thus contact is made on a three-dimensional surface, and the contact region is the contact region 328. On the other hand, the container part 251 of the bucket 230 according to the second example has the plane seating surface 256 as shown in (2) of FIG. and the corresponding seating surface 225 (see FIG. 7) on the swing rotor side is also formed in a plane shape.

In (2) of FIG. 11, a portion applied with diagonal hatching from upper right to lower left is the seating surface 256 of the container part 251, and a portion applied with diagonal hatching from upper left to lower right is the seating surface 225 (see FIG. 7) formed on the swing rotor 202 side. The seating surface 225 on the swing rotor 202 side has a horseshoe shape, but when in an ideal seating position as shown in (2) of FIG. 11, a lower end position 225*a* at an upper side portion of the seating surface 225 does not come into contact with the container part 251 of the bucket 230. Therefore, like the contact regions 228 indicated by cross hatching, the contact positions of the seating surface 225 and the seating surface 256 are dispersed in two places in the left-right direction. Here, comparing (1) and (2) of FIG. 11, the conventional contact region 328 spans three places, that is, the upper side and the left-right direction (the front side and the rear side in the circumferential direction of the swing rotor 202) when viewed from the central axis in the longitudinal direction of the bucket, and thus the possibility that the posture at the time of seating is shifted is greater as compared with the bucket 230 of the example. On the other hand, in the bucket 230 of the example, a gap 229 is formed between the upper side of the seating surface 256 on the swing rotor 202 side and the upper portion of the bucket 230, and there are only two contact regions 228 in directions facing each other with the central axis E1 therebetween, and thus stability is significantly improved when holding the bucket 230. In addition, because the width of the inner part of the seating surface 325 on the swing rotor side can be narrowed from the conventional $S_1$ to $S_2$ of the application, rigidity near the notch part 224 of the swing rotor 202 can be higher than conventional. In addition, even if the width $W_b$ on the short side of the container part 251 of the bucket 230 is narrowed as compared with that of the conventional container part 351, a sample having the same capacity as the conventional one can be put into the tube 260, and thus an easy-to-use convenient bucket 230 and a sample container 260 can be achieved.

The present invention is described above based on the examples, but the present invention is not limited to the above-described examples, and various modifications can be made without departing from the gist of the present invention. For example, in the above-described examples, the example is shown in which the capacity of the sample container 40 is two milliliters and the capacity of the tube 260 is 18 milliliters, but the capacity of the sample container is not limited to these capacities and can be set arbitrarily within a range that can correspond to the rotor 2 or the swing rotor 202.

What is claimed is:

1. A centrifuge, comprising:

a bucket having a rotation axis for swinging; and a swing rotor comprising:

a through hole penetrating from an upper side to a lower side in an axial direction of the swing rotor, a support part rotably holding the rotation axis, and a notch part formed in a direction perpendicular to a central axis of the through hole and formed on a radial outer side of the swing rotor, wherein the centrifuge performing centrifugal separation operation in a state that the bucket is swung around the rotation axis by a rotation of the swing rotor and abuts against the notch part, and wherein the bucket comprises a container part which accommodates a sample and has an opening in which screw means for fastening the container part to a lid part is formed, and the lid part which seals the container part by screwing the screw means and holds the rotation axis, and wherein a flange part having a seating surface seated in the notch part during swinging is formed near the opening of the container part, chamfering is performed in parallel on opposing outer surfaces of the container part having a cylindrical outer shape on a bottom side of the container part with respect to the seating surface, a cross-section shape of a holding hole inside the container part is formed to be elliptical, and a short axis direction of the cross section of the holding hole is arranged parallel to a swing rotation axis direction.

2. The centrifuge according to claim 1, wherein the rotation axis which extends in a direction perpendicular to a longitudinal direction of the container part is arranged in the lid part, wherein the lid part comprises a disk part which covers the opening of the container part and a rotation axis hold part which holds the rotation axis slidably in the axial direction above the disk part, and wherein the flange part is substantially rectangular when viewed from the longitudinal direction, two opposite short side parts whose widths are narrowed and two opposite long side parts whose widths are widened are formed, and the seating surface is formed in a manner of extending from the central axis to a side of the short side parts, and wherein the long side parts are arranged in a direction of an axis of the swing rotation axis from the central axis, and the short side parts are arranged in a direction orthogonal to the axis of the swing rotation axis.

3. The centrifuge according to claim 2, wherein with respect to the shape of the holding hole of the container part, the cross section orthogonal to the central axis is elliptical, a bottom part of the container part which is a front-end is made into a narrowed shape, and the front-end that has being narrowed is made hemispherical.

4. The centrifuge according to claim 3, wherein there is one or more pairs of two parallel plane surfaces in one direction of the outer surface of the container part or a direction orthogonal to the one direction.

5. The centrifuge according to claim 4, wherein a tube integrally formed by a synthetic resin and having an outer shape corresponding to the shape of the holding hole is insertable into the holding hole, and the tube has an elliptical cross section orthogonal to the central axis direction and have two semi-circular portions and two parallel surfaces straightly connecting the two semi-circular portions.

6. The centrifuge according to claim 3, wherein a tube integrally formed by a synthetic resin and having an outer shape corresponding to the shape of the holding hole is insertable into the holding hole, and the tube has an elliptical cross section orthogonal to the central axis direction and have two semi-circular portions and two parallel surfaces straightly connecting the two semi-circular portions.

* * * * *